(12) United States Patent
Kyoden

(10) Patent No.: US 8,505,666 B2
(45) Date of Patent: Aug. 13, 2013

(54) MOTOR-ASSISTED BICYCLE

(75) Inventor: Motoshi Kyoden, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/415,843

(22) Filed: Mar. 9, 2012

(65) Prior Publication Data

US 2012/0247854 A1 Oct. 4, 2012

(30) Foreign Application Priority Data

Mar. 31, 2011 (JP) ................................. 2011-077016

(51) Int. Cl.
*B62M 6/55* (2010.01)

(52) U.S. Cl.
CPC ...................................... *B62M 6/55* (2013.01)
USPC ...................................................... 180/206.4

(58) Field of Classification Search
CPC ...................................................... B62M 6/55
USPC .................... 180/206.1, 206.3, 201.4, 206.5, 180/206.6; 280/274, 276, 281.1, 288.3; 340/426.16, 426.34, 901
See application file for complete search history.

(56) References Cited

U.S. PATENT DOCUMENTS

| | | | | |
|---|---|---|---|---|
| 4,768,798 A | * | 9/1988 | Reed et al. | 280/281.1 |
| 5,318,819 A | * | 6/1994 | Pai | 428/71 |
| 2006/0070784 A1 | * | 4/2006 | Tahara | 180/205 |
| 2011/0042156 A1 | * | 2/2011 | Vincenz | 180/205 |

FOREIGN PATENT DOCUMENTS

JP 2005-297640 10/2005

* cited by examiner

*Primary Examiner* — J. Allen Shriver, II
*Assistant Examiner* — Felicia L Brittman
(74) *Attorney, Agent, or Firm* — Ditthavong Mori & Steiner, P.C.

(57) ABSTRACT

A motor-assisted bicycle includes an assistive motor, a battery module, and an alarm buzzer. The assistive motor is to generate a drive force to assist in a pedaling force applied by a rider to pedals. The battery module includes batteries as a power supply for the assistive motor. The alarm buzzer is mounted in the battery module to generate an alarm sound. The alarm sound generated by the alarm buzzer is emitted in a forward direction of the motor-assisted bicycle.

13 Claims, 19 Drawing Sheets

10A

US 8,505,666 B2

MOTOR-ASSISTED BICYCLE

CROSS-REFERENCE TO RELATED APPLICATIONS

The present application claims priority under 35 U.S.C. §119 to Japanese Patent Application No. 2011-077016, filed Mar. 31, 2011. The contents of this application are incorporated herein by reference in their entirety.

BACKGROUND OF THE INVENTION

1. Field of the Invention
The present invention relates to a motor-assisted bicycle.
2. Discussion of the Background
Japanese Patent Laid-open No. 2005-297640 indicated below proposes a motor-assisted bicycle of the body shell type wherein when a vehicle speed detected by a vehicle speed sensor becomes equal to or greater than a predetermined value, a speed alarm buzzer disposed on the rear surface of the backrest of a seat for the rider to sit on produces an alarm sound to prompt the rider to make a braking action and also to energize a brake motor to prevent the vehicle speed from rising excessively.

SUMMARY OF THE INVENTION

According to one aspect of the present invention, a motor-assisted bicycle includes an assistive motor, a battery module, and an alarm buzzer. The assistive motor is to generate a drive force to assist in a pedaling force applied by a rider to pedals. The battery module includes batteries as a power supply for the assistive motor. The alarm buzzer is to generate an alarm sound. The alarm buzzer is mounted in the battery module to generate an alarm sound. The alarm sound generated by the alarm buzzer is emitted in a forward direction of the motor-assisted bicycle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
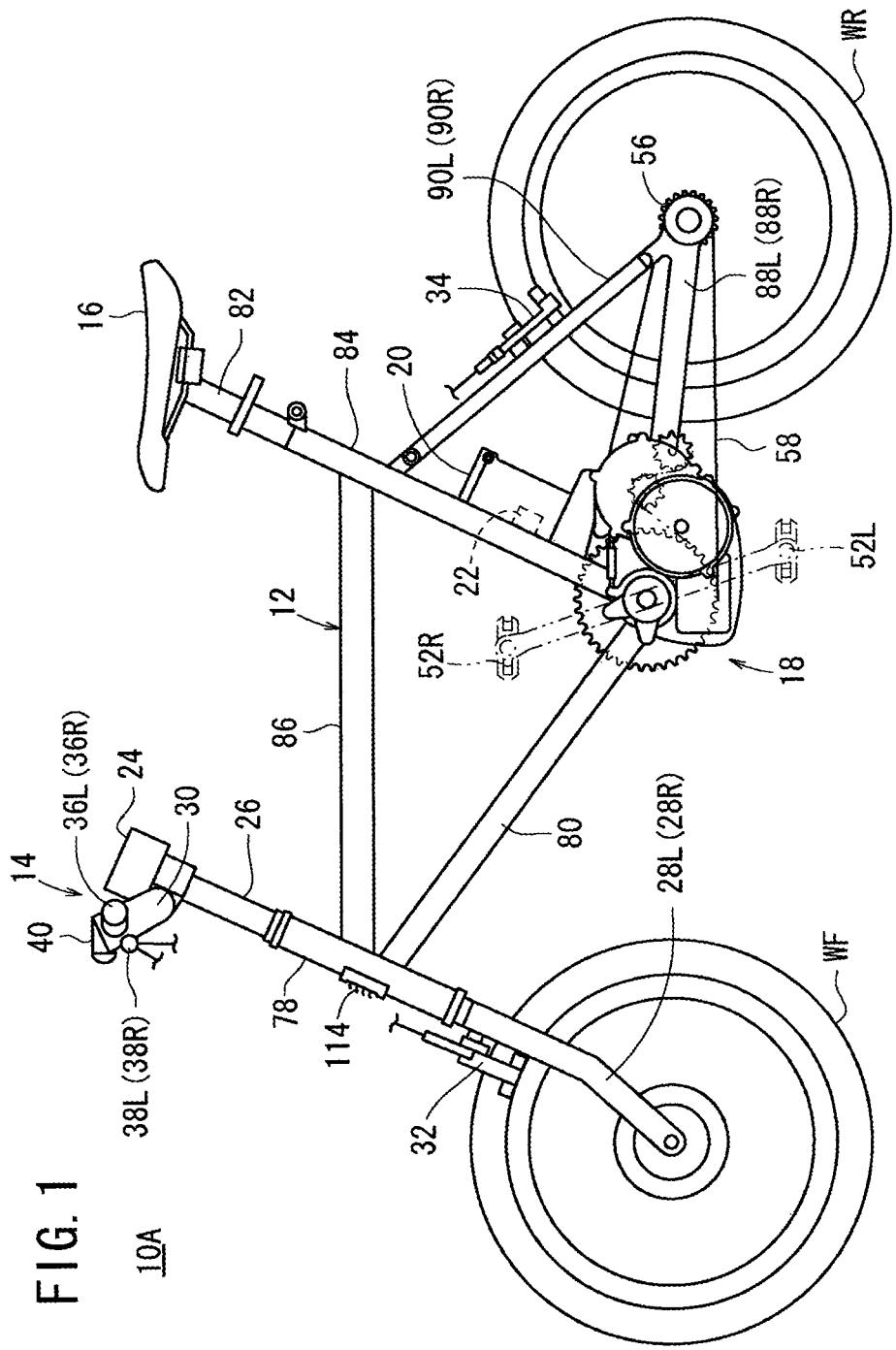
FIG. 1 is a left side elevational view of a motor-assisted bicycle according to a first embodiment of the present invention.

The embodiments will now be described with reference to the accompanying drawings, wherein like reference numerals designate corresponding or identical elements throughout the various drawings.

Motor-assisted bicycles according to embodiments of the present invention will be described in detail below with reference to the accompanying drawings. In motor-assisted bicycles 10A through 10E, some mechanisms and components are symmetrically disposed on left and right sides of the bicycle body, and those on the left side are denoted by reference numerals with a suffix "L" and those on the right side by reference numerals with a suffix "R."

First Embodiment

As shown in FIG. 1, the motor-assisted bicycle 10A is constructed on a body frame 12 as a base, and includes a front wheel WF as a steerable wheel, a rear wheel WR as a drive wheel, a steering unit 14 for steering the front wheel WF, a seat 16 for a rider, not shown, to sit on, a drive mechanism 18 for driving the rear wheel WR, a battery unit 20 mounted on the body frame 12, an alarm buzzer 22 mounted in the battery unit 20, and a display unit 24 mounted on the steering unit 14. Structural details of the body frame 12 will be described later.

The steering unit 14 has a steering shaft 26, a pair of front fork members 28L, 28R extending from the lower end of the steering shaft 26 and supporting the front wheel WF, and a handle 30 mounted on the upper end of the steering shaft 26.

A front wheel cantilever brake 32 for stopping the front wheel WF from rotating is mounted on the front fork members 28L, 28R. A rear wheel cantilever brake 34 for stopping the rear wheel WR from rotating is mounted on stays 90L, 90R, to be described later, of the body frame 12. On the handle 30, there are mounted a pair of grips 36L, 36R to be gripped by the rider, a pair of brake levers 38L, 38R for operating the cantilever brakes 32, 34, and a front lamp 40 for illuminating an area ahead of the bicycle.

Figure 2:
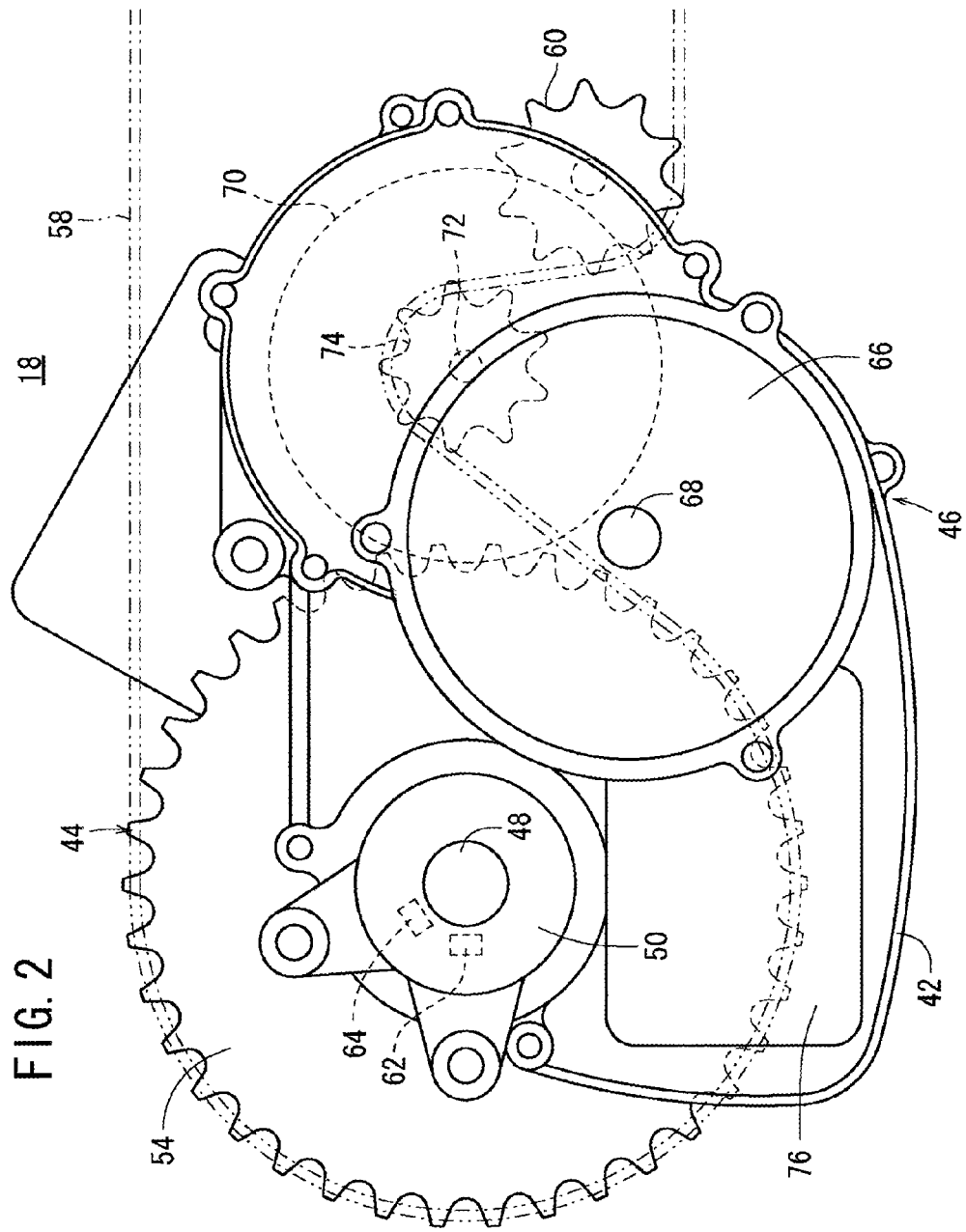
FIG. 2 is an enlarged side elevational view of a drive mechanism shown in FIG. 1.

As shown in FIG. 2, the drive mechanism 18 includes a support plate 42 mounted on the body frame 12, and a power transmitting mechanism 44 and an assistive drive unit 46 that are mounted on the support plate 42.

The power transmitting mechanism 44 includes a crankshaft 48 extending in transverse direction of the bicycle, a crankshaft bearing 50 supporting the crankshaft 48, a pair of pedals 52L, 52R (see FIG. 1) connected respectively to the opposite ends of the crankshaft 48, a drive sprocket 54 connected to the crankshaft 48 through a one-way clutch, not shown, a driven sprocket 56 (see FIG. 1) mounted on the rear wheel WR, a chain 58 trained around the drive sprocket 54 and the driven sprocket 56, and an idler gear 60 for increasing the angle through which the chain 58 is trained.

The crankshaft bearing 50 is associated with a crankshaft rotational speed detector 62 for detecting the rotational speed of the crankshaft 48 and a pedaling torque detector 64 for detecting a pedaling torque acting on the crankshaft 48.

The assistive drive unit 46 includes an assistive motor 66 for generating a drive force (assistive torque) to assist in the pedaling force applied by the rider to the pedals 52L, 52R, a drive gear 70 rotatable in mesh with a drive shaft 68 of the assistive motor 66, and a driven shaft 72 rotatable in unison with the drive gear 70. The assistive drive unit 46 also includes an assistive sprocket 74 with the chain 58 trained therearound and an assistive controller 76 for controlling energization of the assistive motor 66.

The assistive drive unit 46 thus constructed operates to transmit the assistive torque generated by the assistive motor 66 to the chain 58 through the drive shaft 68, the drive gear 70, and the assistive sprocket 74. The pedaling torque that is applied to the crankshaft 48 when the rider pushes the pedals 52L, 52R and the assistive torque generated by the assistive motor 66 are transmitted through the chain 58 to the driven sprocket 56, rotating the rear wheel WR.

The assistive controller 76 according to the present embodiment can generate the assistive torque in three modes ("power mode," "automatic mode," and "ecological mode"), for example. The "power mode" refers to a mode in which the ratio of the assistive torque to the pedaling torque (assistive ratio) is high. The "automatic mode" refers to a mode in which the assistive ratio is lower than the "power mode." The "ecological mode" refers to a mode in which the assistive ratio is lower than the "automatic mode."

Figure 3:
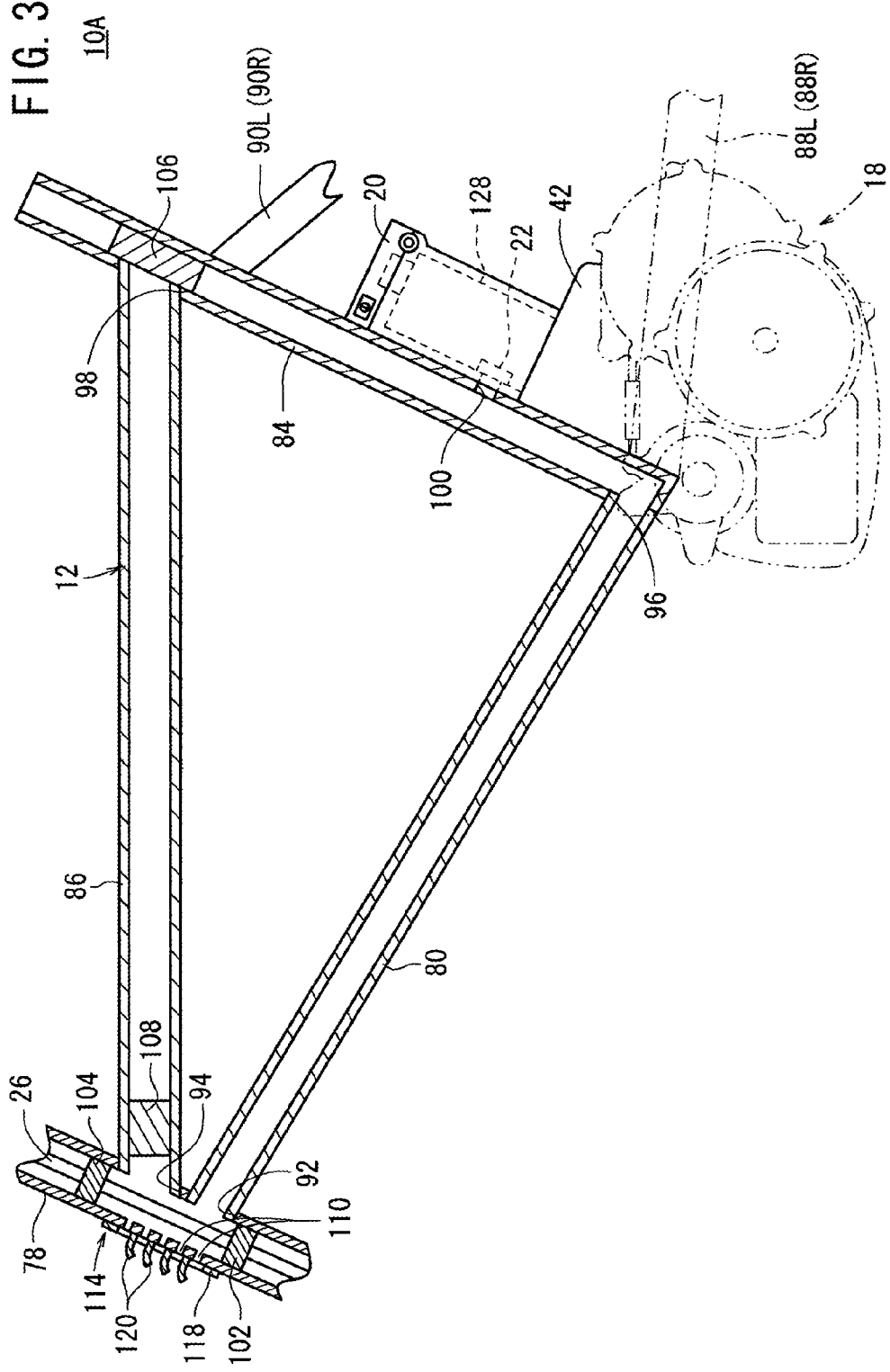
FIG. 3 is a cross-sectional view, partly omitted from illustration, of a body frame shown in FIG. 1.

As shown in FIGS. 1 and 3, the body frame 12 includes a head tube 78 on which the steering shaft 26 is steerably supported, a down tube 80 extending rearwardly and downwardly of the bicycle from the head tube 78, a seat tube 84 extending upwardly from the rear end of the down tube 80, with a seat post 82 supporting a seat 16 and mounted in the seat tube 84 for allowing the seat 16 to be adjusted in vertical position, a top tube 86 disposed above the down tube 80 and interconnecting the head tube 78 and the seat tube 84, a pair of rear fork members 88L, 88R extending rearwardly from the lower end of the seat tube 84 and supporting the rear wheel WR, and a pair of stays 90L, 90R interconnecting the rear ends of the rear fork members 88L, 88R and the seat tube 84.

As shown in FIG. 3, the head tube 78 has a first fitting hole 92 and a second fitting hole 94 which are defined in a portion of an outer circumferential wall thereof which faces rearwardly with respect to the bicycle. The down tube 80 has an end fitted in the first fitting hole 92, and the top tube 86 has an end fitted in the second fitting hole 94. The seat tube 84 has a third fitting hole 96 and a fourth fitting hole 98 which are defined in a portion of an outer circumferential wall thereof which faces forwardly of the bicycle. The other end of the down tube 80 is fitted in the third fitting hole 96, and the other end of the top tube 86 is fitted in the fourth fitting hole 98.

The outer circumferential wall of the seat tube 84 has an inlet opening 100 defined in a portion thereof which faces rearwardly of the bicycle. The inlet opening 100 introduces an alarm sound generated by the alarm buzzer 22 into the seat tube 84.

A first sound insulating member 102 is disposed in the head tube 78 slightly below the first fitting hole 92, and a second sound insulating member 104 is disposed in the head tube 78 slightly above the second fitting hole 94. A third sound insulating member 106 is disposed in the seat tube 84 in closing relation to the opening in the other end of the top tube 86, and a fourth sound insulating member 108 is disposed in the end of the top tube 86.

The alarm sound of the alarm buzzer 22 which is introduced through the inlet opening 100 into the seat tube 84 is propagated through the down tube 80 into a space between the first sound insulating member 102 and the second sound insulating member 104 in the head tube 78.

The first through fourth sound insulating members 102, 104, 106, 108 may be made of a material, e.g., metal, resin, etc. capable of preventing the alarm sound of the alarm buzzer 22 which has been introduced into the seat tube 84 from spreading out. If the first through fourth sound insulating members 102, 104, 106, 108 are made of metal, in particular, they can appropriately reflect the alarm sound. Therefore, it is possible to efficiently propagate the alarm sound into the space between the first sound insulating member 102 and the second sound insulating member 104 in the head tube 78.

Figure 4:
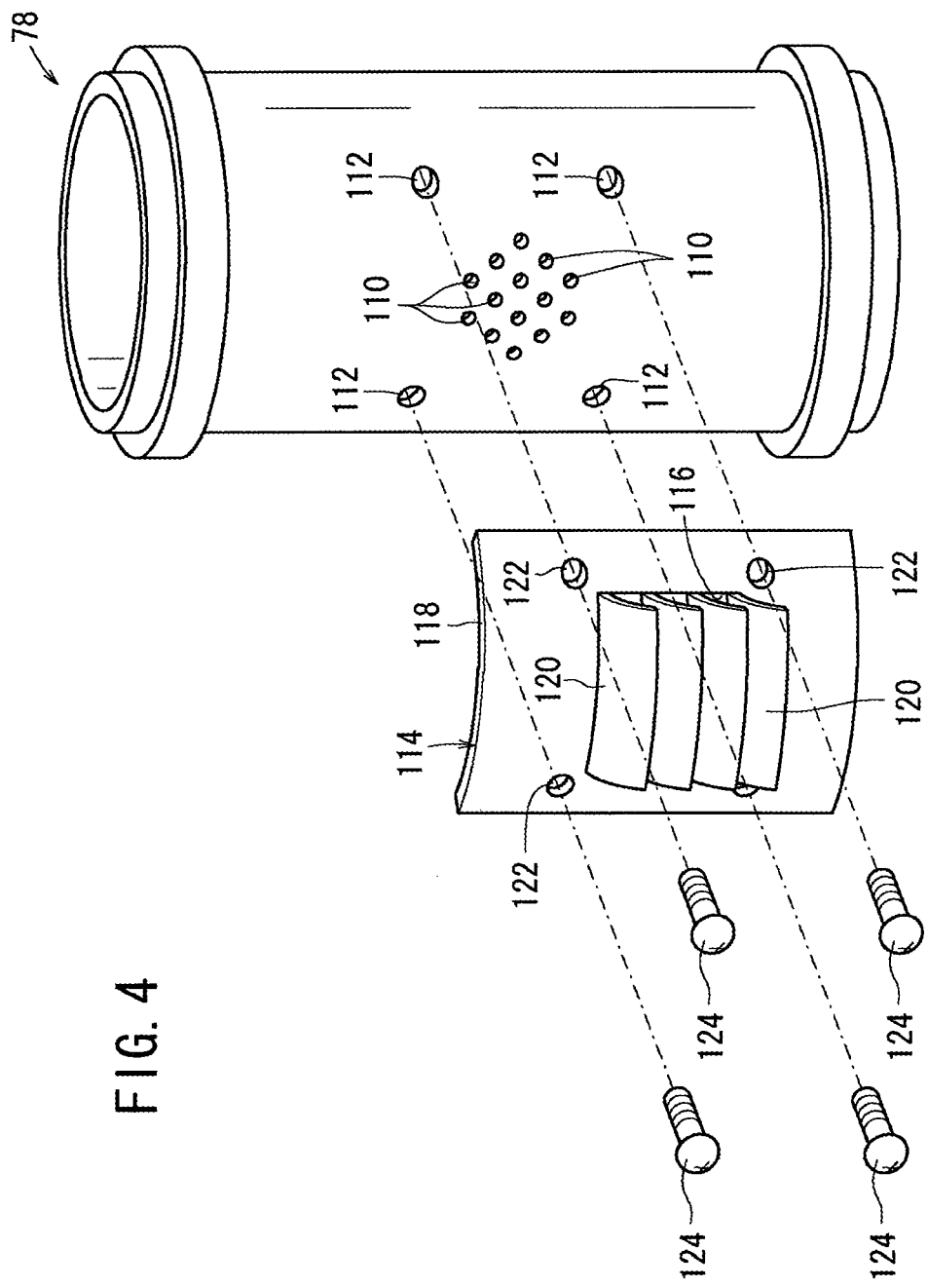
FIG. 4 is an exploded perspective view of a head tube and a cover shown in FIG. 3.

As shown in FIG. 4, a portion of the head tube 78 which faces forwardly of the bicycle has a plurality of (fourteen in FIG. 4) sound radiating holes 110 . . . 110 defined therein for emitting the alarm sound propagated into the head tube 78 in the forward direction of the bicycle, and a plurality of (four in FIG. 4) screw holes 112 . . . 112 defined therein. The sound radiating holes 110 . . . 110 are positioned substantially centrally in the longitudinally direction of the head tube 78.

A cover 114 is disposed on the portion of the head tube 78 which faces forwardly of the bicycle in covering relation to the sound radiating holes 110 . . . 110. The cover 114 has a holding plate 118 with a rectangular opening 116 defined centrally therein and a plurality of (four in FIG. 4) arcuate cover slats 120 . . . 120 disposed in the opening 116. The holding plate 118 is of a rectangular shape as viewed in plan, and has through holes 122 defined in respective corners thereof. The holding plate 118 is firmly fastened to the head tube 78 by bolts 124 which are inserted through the respective through holes 122 and threaded into the respective screw holes 112.

Each of the cover slats 120 fixed to wall surfaces which define the opening 116 in the holding plate 118 such that it is convex in the upward direction of the bicycle. The cover slats 120 . . . 120 are spaced at predetermined intervals along the longitudinal direction of the head tube 78.

The cover slats 120 . . . 120 can prevent foreign matter such as rainwater or the like from entering the head tube 78 (the body frame 12) through the sound radiating holes 110 . . . 110, and hence from corroding the inside of the body frame 12 by rainwater or the like. Since there is a certain gap between adjacent one of the cover slats 120 as described above, the alarm sound emitted through the sound radiating holes 110 . . . 110 is essentially not blocked by the cover slats 120.

Figure 5:
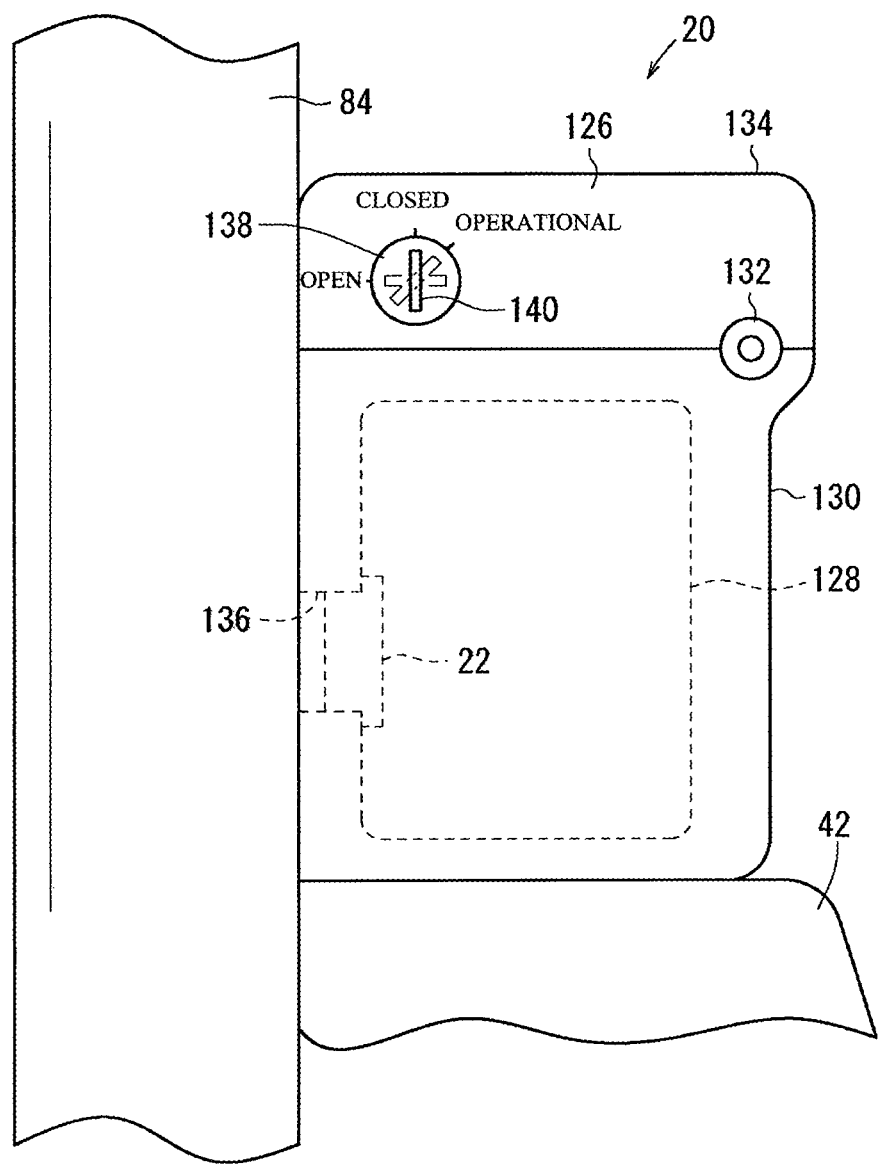
FIG. 5 is an enlarged side elevational view of a battery and a seat tube shown in FIG. 1.
Figure 6:
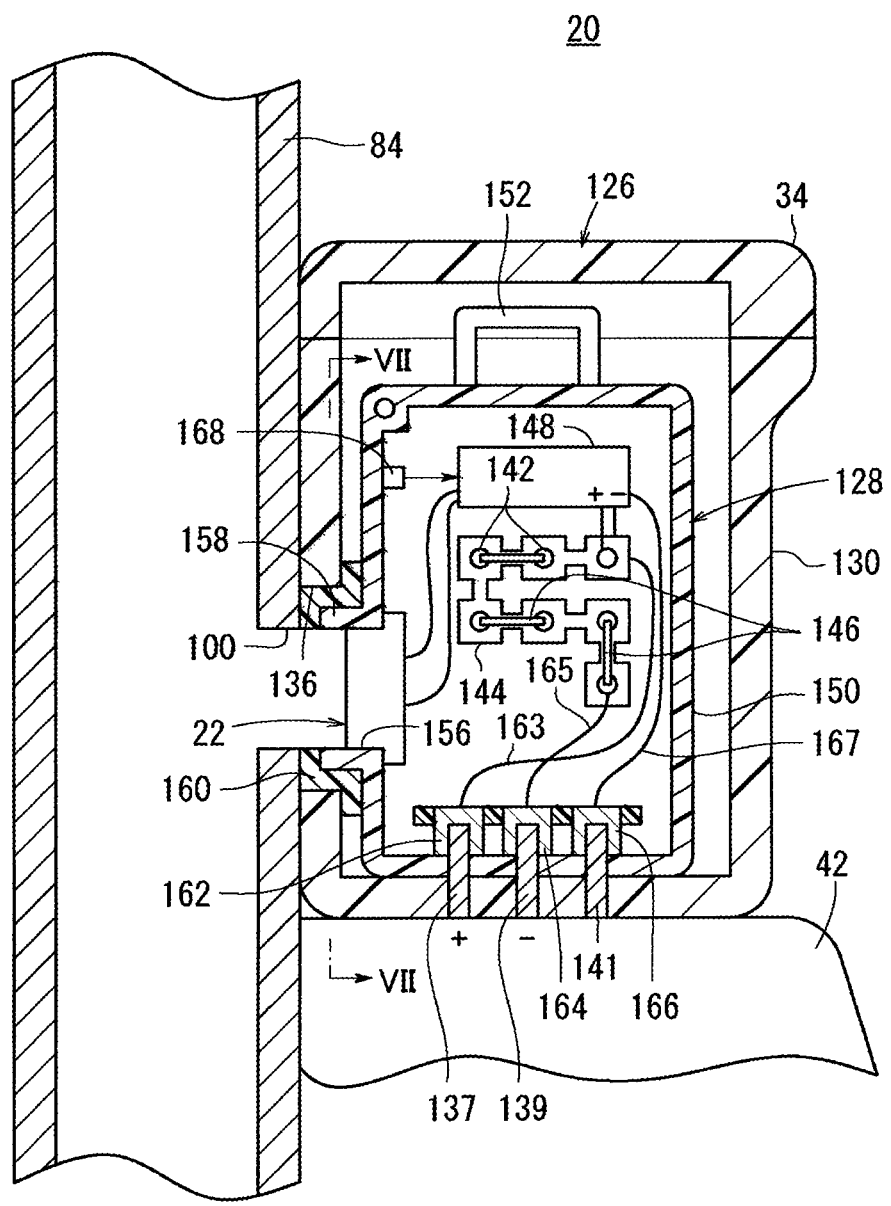
FIG. 6 is a cross-sectional view of the battery and the seat tube shown in FIG. 5.

As shown in FIGS. 5 and 6, the battery unit 20 has a battery case (case member) 126 fixed to the seat tube 84 and the support plate 42 and a battery module 128 housed in the battery case 126.

The battery case 126 includes a battery case body 130 disposed rearwardly of the seat tube 84 with respect to the bicycle and a lid 134 openably and closably mounted on the battery case body 130 by a hinge 132. The battery case body 130 has a hole 136 defined therein in alignment with the inlet opening 100 of the seat tube 84. The hole 136 is greater in size than the inlet opening 100.

On the bottom of the battery case body 130, there are mounted a pair of power supply male terminals 137, 139 for supplying electric power from the battery unit 20 to the assistive drive unit 46 and the front lamp 40, and a signal male terminal 141 for exchanging information (signals) between such as the display unit 24, the crankshaft rotational speed detector 62, and the pedaling torque detector 64, and the battery module 128 described above.

The lid 134 has a key unit 138 with a keyhole, not shown, defined therein. When the key unit 138 is turned by a key 140 inserted in the keyhole, the key unit 138 can bring the key 140 selectively into a "closed position," an "open position," and an "operational position." In the "closed position," the lid 134 is locked on the battery case body 130. In the "open position," the lid 134 is unlocked from the battery case body 130. In the "operating position," the assistive motor 66 can be driven.

The battery module 128 includes a plurality of (seven in FIG. 6) batteries 142 . . . 142 as a power supply for the assistive motor 66, a battery holder 144 holding the batteries 142 . . . 142, a plurality of connectors 146 . . . 146 electrically connecting the batteries 142 . . . 142 in series with each other, a controller (monitoring means) 148 for monitoring the state of the batteries 142 . . . 142, a casing 150 housing the batteries 142 . . . 142 and the controller 148 therein, and a handle 152 mounted on the casing 150. Specific configurational details of the controller 148 will be described later.

Figure 7:
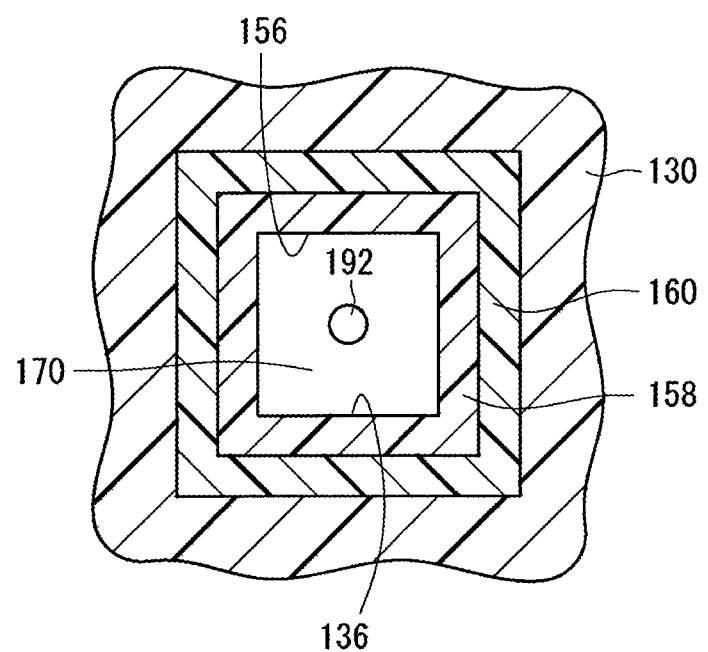
FIG. 7 is a cross-sectional view taken along line VII-VII of FIG. 6.

The casing 150 includes a mount 158 projecting forwardly therefrom with respect to the bicycle (toward the seat tube 84) and having a square (see FIG. 7) through hole 156 defined therein with the alarm buzzer 22 fitted therein. A seal member 160 is disposed on the mount 158 in surrounding relation to a wall that serves as the through hole 156. The seal member 160 is held in abutment against a wall surface of the battery case body 130 which defines the hole 136 and also against an outer surface of the seat tube 84, thereby preventing external foreign matter from entering the inlet opening 100 and the through hole 156 and also preventing the alarm sound generated by the alarm buzzer 160 from leaking out. The seal member 160 may be made of a resin material, for example.

On the bottom of the casing 150, there are disposed power supply female terminals 162, 164 for fitting over the pair of the power supply male terminals 137, 139, respectively, and a signal female terminal 166 for fitting over the signal male terminal 141. When the power supply female terminals 162, 164 fit over the power supply male terminals 137, 139, respectively, and the signal female terminal 166 fits over the signal male terminal 141, the battery module 128 can be held in the battery case 126.

The power supply female terminal 162 is electrically connected to the anodes of the batteries 142 . . . 142 by a lead 163, and the power supply female terminal 164 is electrically connected to the cathodes of the batteries 142 . . . 142 by a lead 165. The signal female terminal 166 is electrically connected to the controller 148 by a lead 167. The casing 150 houses therein a vibration detector 168 for detecting vibrations of the battery unit 20.

Figure 8:
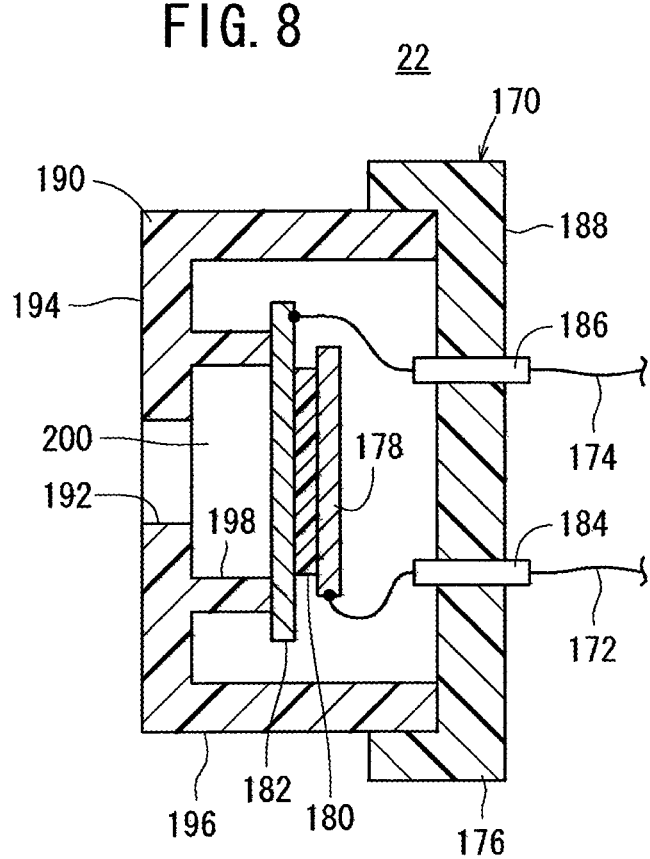
FIG. 8 is a vertical cross-sectional view of an alarm buzzer shown in FIG. 6.

As shown in FIG. 8, the alarm buzzer 22 has an alarm buzzer body 170 and a pair of leads (connecting lines) 172, 174 which electrically connect the alarm buzzer body 170 to the controller 148. The alarm buzzer body 170 has a casing 176 fixed to the mount 158. The casing 176 houses therein an electrode plate 178 electrically connected to the lead 172, a piezoelectric plate 180 fixed to one surface of the electrode plate 178, and a metal vibration plate 182 fixed to one surface of the piezoelectric plate 180 and electrically connected to the lead 174.

The casing 176 includes a base 188 having a holder tube 184 which holds the lead 172 and a holder tube 186 which holds the lead 174, and a sound cover 190 mounted on the base 188. The sound cover 190 includes a flat plate 194 which can be fitted in the through hole 156 defined in the mount 158 and which has a central circular hole 192 (see also FIG. 7), a tubular side plate 196 projecting from the edges of the flat plate 194 toward the base 188, and a tubular body 198 disposed within the side plate 196 and projecting from a surface of the flat plate 194 toward the base 188.

As can be seen from FIG. 8, the distance that the tubular body 198 projects is about one-half of the distance that the side plate 196 projects. The vibration plate 182 has a surface fixed to an end face of the tubular body 198, thereby closing the opening in the end of the tubular body 198 remote from the flat plate 194 with the vibration plate 182. As a result, the tubular body 198 has a resonant chamber 200 defined therein.

In the alarm buzzer 22 thus configured as described above, when an AC voltage is applied to the piezoelectric plate 180 to expand and contract the piezoelectric plate 180, vibratory sounds of the vibration plate 182 are resonantly amplified in the resonant chamber 200 and output as an alarm sound through the hole 192.

Figure 9:
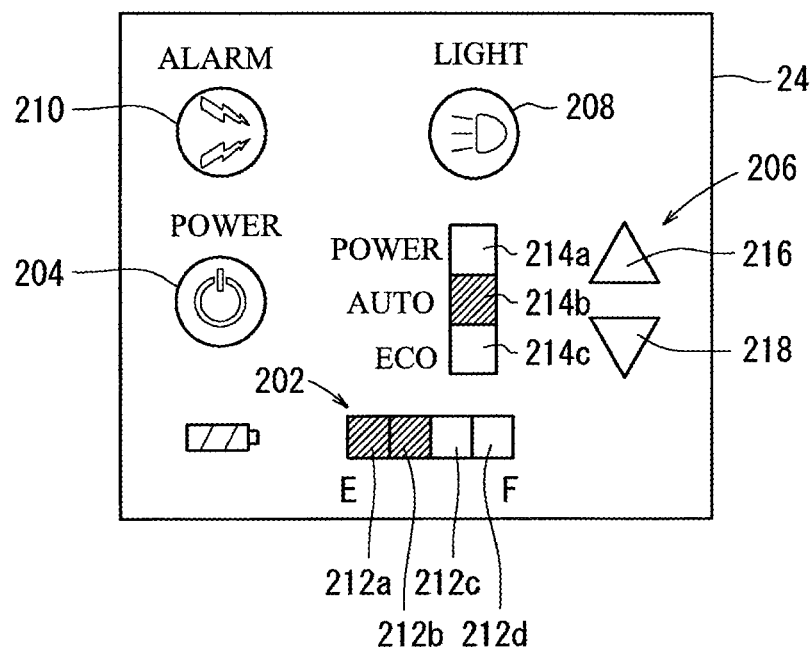
FIG. 9 is a view showing a display unit.

As shown in FIGS. 1 and 9, the display unit 24, which is mounted on the upper end of the steering shaft 26, has a battery level indicator 202 for indicating the remaining battery level of the batteries 142 . . . 142, a power switch 204 for energizing the assistive motor 66, a mode selector 206 for selecting an assistive ratio of the assistive motor 66, an illumination switch 208 for turning on and turning off the front lamp 40, and an alarm button 210 for generating an alarm sound of the alarm buzzer 22.

The battery level indicator 202 includes an array of plural (four in the present embodiment) level indicating LEDs 212a through 212d. A letter "E" (Empty) indicating that the remaining battery level is nil is applied at an end of the array of the level indicating LEDs 212a through 212d (near the level indicating LED 212a), and a letter "F" (Full) indicating that the remaining battery level is full is applied at the other end of the array of the level indicating LEDs 212a through 212d (near the level indicating LED 212d). A figure representing a battery is shown at a position adjacent to the level indicating LED 212a.

The battery level indicator 202 is capable of indicating remaining battery levels in four steps by selectively turning on and turning off the level indicating LEDs 212a through 212d. In FIG. 9, two of the level indicating LEDs 212a, 212b near one end (Empty) of the array are turned on, and the other level indicating LEDs 212c, 212d are turned off, indicating that the remaining battery level is about one-half of the full capacity.

The mode selector 206 includes a plurality of (three in the present embodiment) mode selecting LEDs 214a through 214c which are arrayed perpendicularly to the array of level indicating LEDs 212a through 212d, and a pair of selector buttons 216, 218 disposed in the vicinity of the mode selecting LEDs 214a through 214c. The mode selecting LEDs 214a through 214c are associated with letters representing "POWER," "AUTO," "ECO," respectively. The rider can select either one of the "power mode," the "automatic mode," and the "ecological mode" by operating the selector buttons 216, 218.

In FIG. 9, the mode selecting LED 214b indicative of the "automatic mode" is turned on, and the mode selecting LED 214a indicative of the "power mode" and the mode selecting LED 214c indicative of the "ecological mode" are turned off, indicating that the "automatic mode" is selected.

Figure 10:
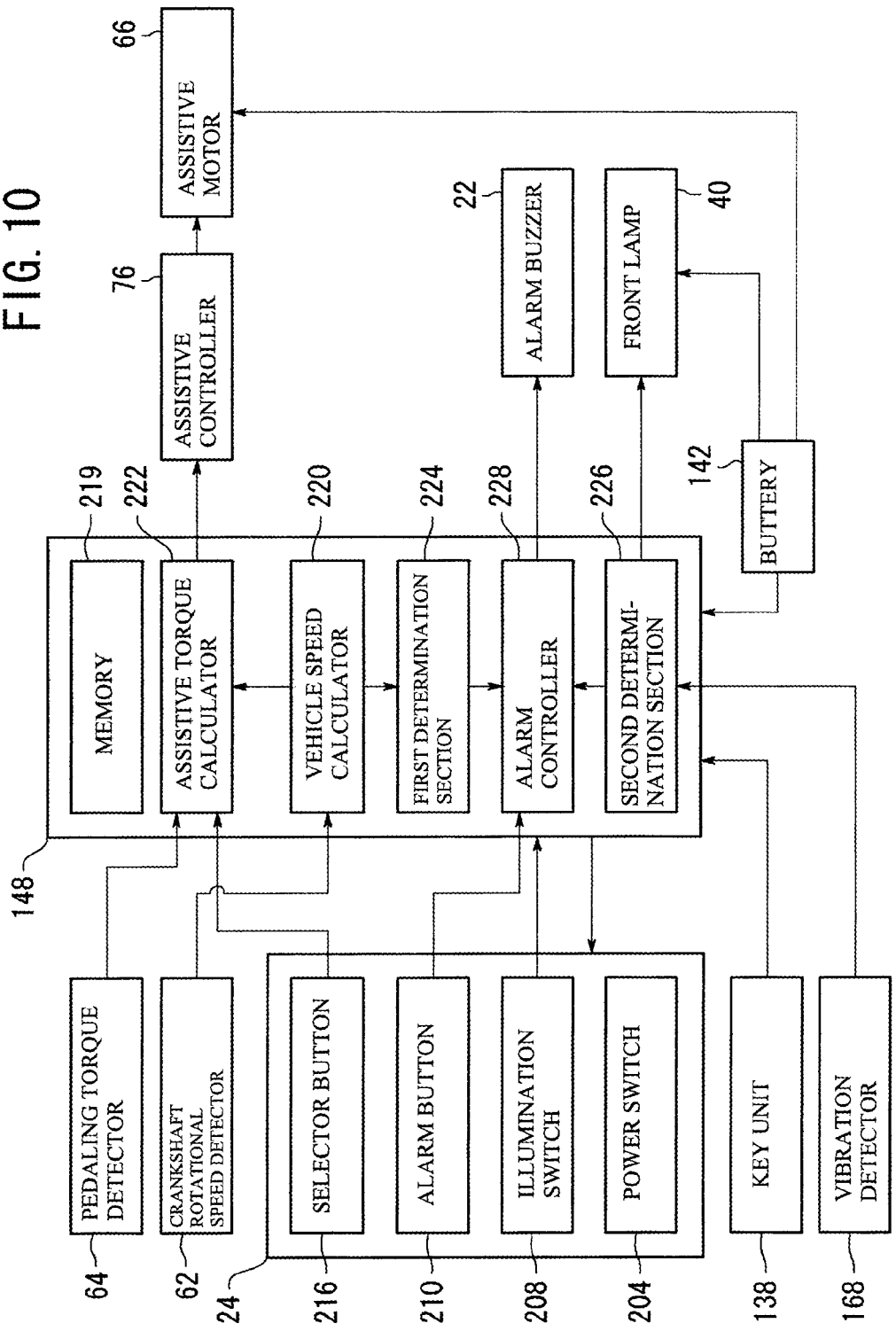
FIG. 10 is a block diagram of an internal configuration of a controller.

As shown in FIG. 10, the controller 148 monitors the state (e.g., the remaining battery level) of the batteries 142 . . . 142, outputs the information of the monitored state to the display unit 24, and selectively turns on and turns off the front lamp 40 based on an output signal from the illumination switch 208. The controller 148 is capable of detecting the position of the key 140 based on an output signal from the key unit 138.

The controller 148 has a memory 219, a vehicle speed calculator 220, an assistive torque calculator 222, a first determination section 224, a second determination section 226, and an alarm controller 228.

The memory 219 stores a first vehicle speed value Va, a second vehicle speed value Vb, and a predetermined vibration frequency va. The first vehicle speed value Va is a lower-limit speed value for generating an alarm sound, and is set to 5 [km/h], for example. The second vehicle speed value Vb is an upper-limit speed value for generating an alarm sound, and is set to 20 [km/h], for example. The predetermined vibration frequency va is set to the vibration frequency of vibrations, for example, that are generated in the battery unit 20 when the motor-assisted bicycle 10A is travelling or when an attempt is being made to force the battery case 126 off from the body frame 12.

The vehicle speed calculator 220 calculates a vehicle speed V based on the crankshaft rotational speed detected by the crankshaft rotational speed detector 62. The assistive torque calculator 222 calculates an assistive torque based on the vehicle speed V calculated by the vehicle speed calculator 220 (hereinafter also referred to as "calculated vehicle speed V"), the pedaling torque detected by the pedaling torque detector 64, and the mode selected by the selector buttons 216, 218, and outputs the calculated assistive torque to the assistive controller 76.

The first determination section 224 determines whether the calculated vehicle speed V falls in a range between the first vehicle speed value Va and the second vehicle speed value Vb or not. The second determination section 226 determines whether or not the vibration frequency v detected by the vibration detector 168 (hereinafter also referred to as "detected vibration frequency v") exceeds the predetermined vibration frequency va.

The alarm controller 228 drives the alarm buzzer 22 to generate an alarm sound based on at least one of the decision made by the first determination section 224, the output signal from the alarm button 210, and the decision made by the second determination section 226.

An operation sequence of the controller 148 of the motor-assisted bicycle 10A for operating the alarm buzzer 22 will be described below with reference to FIG. 11.

Figure 11:
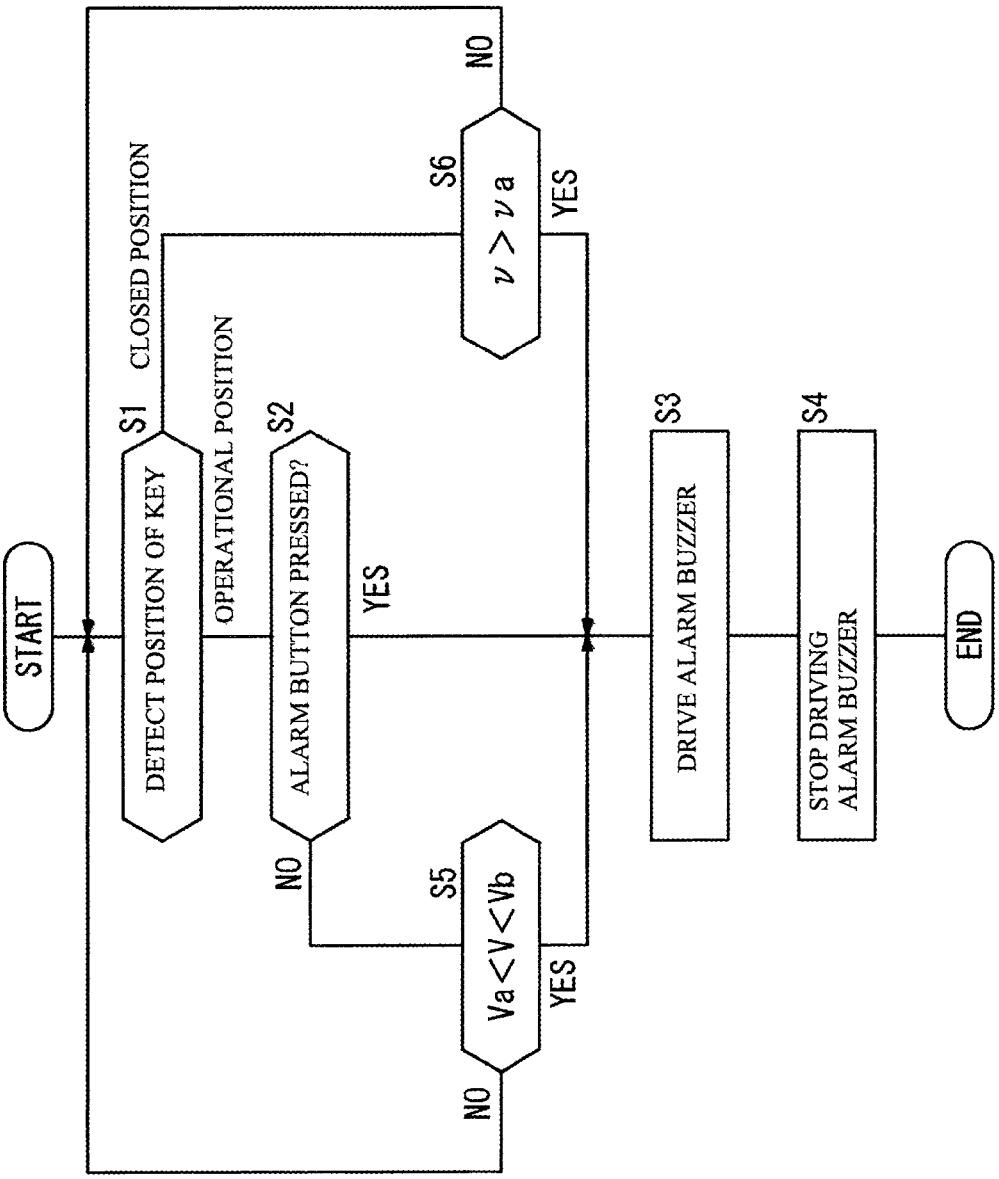
FIG. 11 is a flowchart of an operation sequence of the controller shown in FIG. 10 for producing an alarm sound.

First, the controller 148 detects the position of the key 140 based on the output signal from the key unit 138 (step S1 shown in FIG. 11). If the key 140 is in the operational position, control goes to step S2. If the key 140 is in the closed position, then control goes to step S6. If the key 140 is in the open position in step S1, the present control routine is not executed because the battery module 128 is being replaced.

If the key 140 is in the operational position, then the controller 148 determines whether or not the alarm button 210 is pressed (step S2). If the alarm button 210 is pressed (step S2: YES), then the alarm controller 228 drives the alarm buzzer 22 to generate an alarm sound (step S3).

The alarm sound generated by the alarm buzzer 22 is introduced through the inlet opening 100 into the seat tube 84, and propagated through the down tube 80 into the head tube 78. At this time, part of the alarm sound that is propagated in the seat tube 84 toward the seat post 82 is reflected by the third sound insulating member 106 and travels toward the down tube 80. Therefore, the alarm sound can be propagated into the head tube 78 more efficiently than if it were not for the third sound insulating member 106.

The alarm sound propagated into the head tube 78 is prevented by the fourth sound insulating member 108 from being propagated into the top tube 86, and is also prevented by the first sound insulating member 102 and the second sound insulating member 104 from being dispersed in the head tube 78. Therefore, the alarm sound is radiated through the sound radiating holes 110 . . . 110 in the forward direction of the bicycle. As the alarm sound is thus efficiently transmitted to walking people around the bicycle, it can capture attention of those walking people around the bicycle. Thereafter, the alarm controller 228 stops energizing the alarm buzzer 22 (step S4).

If the alarm button 210 is not pressed in step S2, then the first determination section 224 determines whether or not the calculated vehicle speed V falls in the range between the first vehicle speed value Va and the second vehicle speed value Vb (step S5). If the calculated vehicle speed V does not fall in the range between the first vehicle speed value Va and the second vehicle speed value Vb (step S5: NO), then the processing of step S1 is carried out.

If the calculated vehicle speed V is smaller than the first vehicle speed value Va (e.g., if the motor-assisted bicycle 10A is at rest), then there is little need for seeking attention of the walking people around the bicycle. Therefore, while the motor-assisted bicycle 10A is at rest, the alarm sound is prevented from being continuously generated. If the rider wants the alarm sound to be generated while the motor-assisted bicycle 10A is at rest, then the rider may press the alarm button 210.

If the calculated vehicle speed V is greater than the second vehicle speed value Vb, then the noise (the noise produced by the assistive motor 66 while being driven, etc.) that the motor-assisted bicycle 10A makes while traveling is of a level large enough to capture attention of the walking people around the bicycle.

If the calculated vehicle speed V falls in the range between the first vehicle speed value Va and the second vehicle speed value Vb (step S5: YES), then processing of steps S3, S4 is carried out. Therefore, even when the calculated vehicle speed V is smaller than the second vehicle speed value Vb and the noise that the motor-assisted bicycle 10A makes while traveling is low, the alarm buzzer 22 is driven, thus capturing attention of the walking people around the bicycle.

If the key 140 is in the closed position in step S1, the second determination section 226 determines whether or not the detected vibration frequency v is greater than the predetermined vibration frequency va (step S6). If the vibration frequency v is equal to or smaller than the predetermined vibration frequency va (step S6: NO), then the processing of step S1 is carried out because the motor-assisted bicycle 10A is parked.

If the detected vibration frequency v is greater than the predetermined vibration frequency va (step S6: YES), then processing of steps S3, S4 is carried out. Therefore, when the motor-assisted bicycle 10A is travelling or an attempt is being made to force the battery case 126 off from the body frame 12 with the key 140 being not in the operational position, the alarm sound is generated, thus preventing the motor-assisted bicycle 10A and the battery unit 20 from being stolen. After the processing of step S4, the controller 148 finishes the present control routine.

With the motor-assisted bicycle 10A according to the present embodiment, inasmuch as the battery module 128 and the alarm buzzer 22 are housed together in the battery case 126 mounted on the seat tube 84, the battery module 128 and the alarm buzzer 22 are efficiently located together, and the battery case 126 is shared by the battery module 128 for protection thereof (water resistance) and the alarm buzzer 22 for protection thereof (water resistance).

As a space for installing the alarm buzzer 22 therein may be smaller than if the alarm buzzer 22 were disposed outside of the battery case 126, it is easy to keep the installation space for the alarm buzzer 22. The number of parts used can be reduced as there is no need for a component (dedicate stay or the like) with which to install the alarm buzzer 22 directly on the body frame 12.

In the present embodiment, the alarm sound introduced into the seat tube 84 is propagated through the seat tube 84 and the down tube 80 to the head tube 78, and then radiated forwardly of the bicycle through the sound radiating holes 110 . . . 110. In other words, the seat tube 84 and the down tube 80 function as a propagator (joint tube) 81, and the head tube 78 functions as a sound radiator. Consequently, the number of parts used can be reduced compared with an arrangement wherein the alarm sound is propagated through a propagating member other than the body frame 12 and radiated therefrom. Therefore, the manufacturing cost of the motor-assisted bicycle 10A is reduced.

According to the present embodiment, since the alarm controller 228 and the first determination section 224 are included in the controller 148, the motor-assisted bicycle 10A is rendered more compact than if the alarm controller 228, the first determination section 224, and the controller 148 were separately provided.

The motor-assisted bicycle 10A according to the present embodiment is not limited to the above arrangement. The battery unit 20 may be mounted on a portion of the outer circumferential wall of the seat tube 84 which faces forwardly with respect to the bicycle. In such a case, the battery unit 20 is disposed in a space surrounded by the head tube 78, the down tube 80, the seat tube 84, and the top tube 86.

Second Embodiment

A motor-assisted bicycle 10B according to a second embodiment of the present invention will be described below with reference to FIGS. 12 and 13. Those components of the second embodiment which are identical to those of the above embodiment are denoted by identical reference characters, and will not be described in detail below. This holds true also for third through fifth embodiments to be described later.

Figure 12:
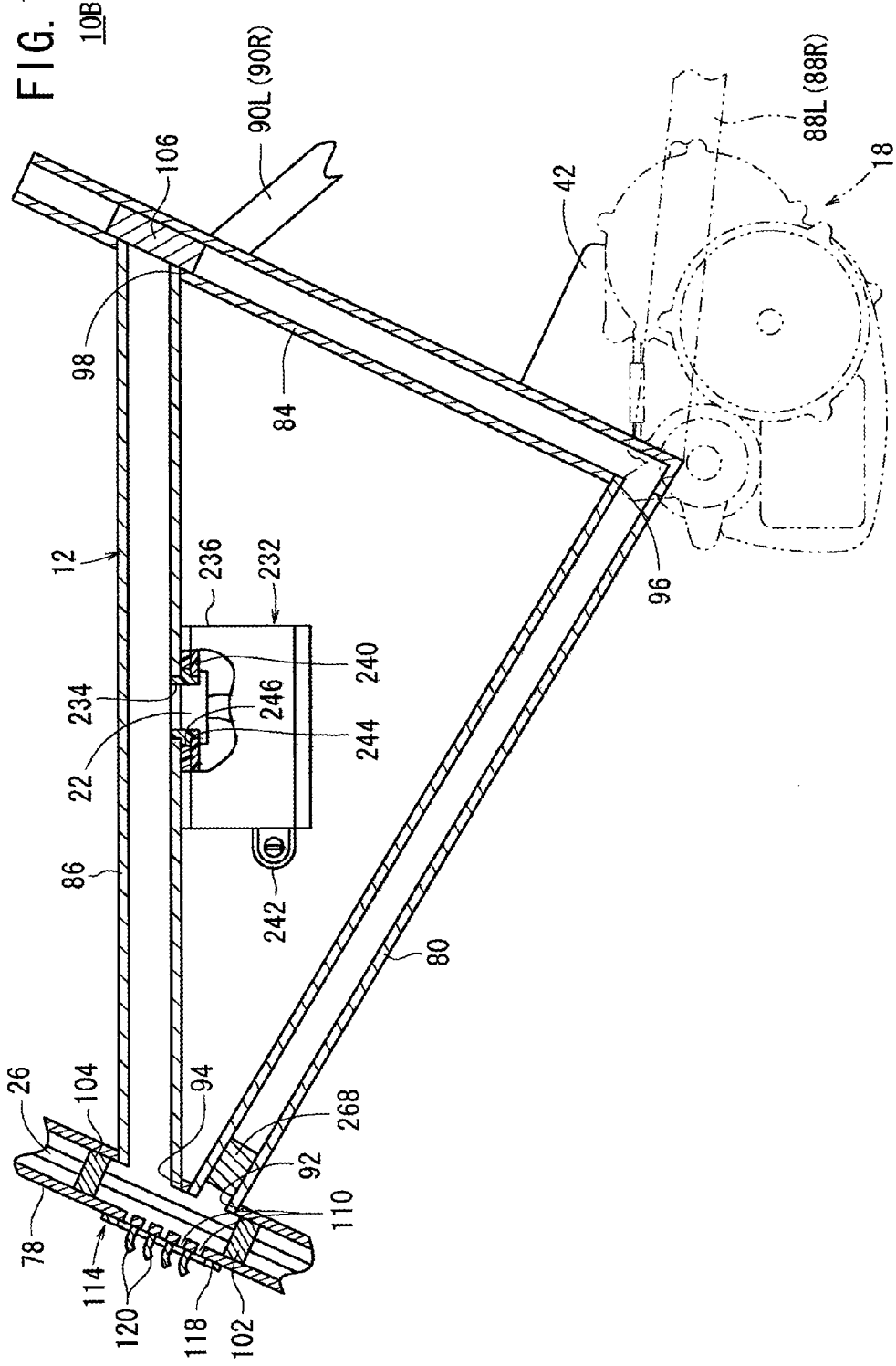
FIG. 12 is a cross-sectional view, partly omitted from illustration, showing a central portion of a motor-assisted bicycle according to a second embodiment of the present invention.

As shown in FIG. 12, the motor-assisted bicycle 10B according to the present embodiment includes a battery unit 232 mounted on a portion of the outer circumferential surface of the top tube 86 which faces the down tube 80. The top tube 86 has an inlet opening 234 defined therein for introducing the alarm sound from the alarm buzzer 22 into the top tube 86.

Figure 13:
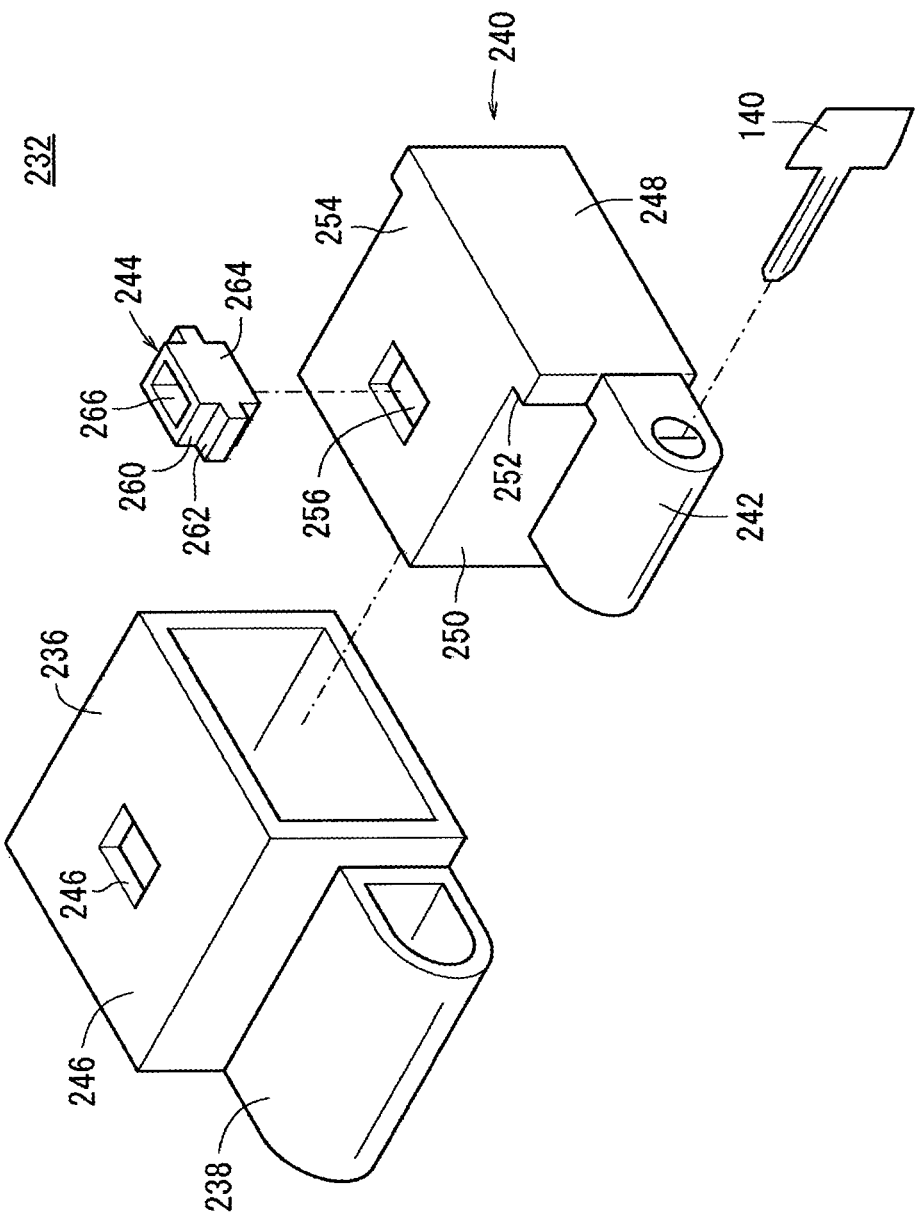
FIG. 13 is an exploded perspective view of a battery shown in FIG. 12.

As shown in FIG. 13, the battery unit 232 includes a bottomed tubular battery case (case member) 236, a bottomed tubular key unit case 238 mounted on the battery case 236, a battery module 240 mounted in the battery case 236, a key unit 242 mounted in the key unit case 238, and a seal member 244. The battery case 236 has a hole 246 defined in a side wall thereof which is aligned with the inlet opening 234 of the top tube 86 and greater than the inlet opening 234 (see FIG. 12).

The battery module 240 has a casing 248 housing the batteries 142 . . . 142, the controller 148, etc. therein. The casing 248 includes a base 250 in shape of a rectangular parallelepiped which can be housed in the battery case 236, and a pair of flanges 252, 254 projecting from an end of the base 250 along the transverse direction of the bicycle.

The base 250 has a hole 256 defined in an upper surface thereof with respect to the bicycle. The hole 256 is aligned with the inlet opening 234 of the top tube 86 and has a size which is substantially the same as the size of the inlet opening 234. A key unit 242 is mounted on the flange 252. The key unit 242, which is mounted in the key unit case 238, allows the key 140 to be selectively brought into the "closed position," the "open position," or the "operational position," as with the first embodiment.

The seal member 244 includes a first seal 260 held in abutment against a wall surface which defines the inlet opening 234, a second seal 262 held in abutment against a wall surface which defines the hole 246 of the battery case 236, and a third seal 264 held in abutment against a wall surface which defines the hole 256 of the base 250. The first seal 260, the second seal 262, and the third seal 264 are integrally combined with each other. The seal member 244 has a through hole 266 defined therein which extends through the first through third seals 260, 262, 264. The alarm buzzer 22 can be fitted in the through hole 266.

As can be seen from FIG. 12, a fifth sound insulating member 268 is disposed in an end portion of the down tube 80. The fourth sound insulating member 108 is dispensed with.

With the motor-assisted bicycle 10B according to the present embodiment, the alarm sound generated by the alarm buzzer 22 is introduced through the inlet opening 234 into the top tube 86, and propagated therethrough into the head tube 78. At this time, part of the alarm sound that is propagated in the top tube 86 toward the seat tube 84 is reflected by the third sound insulating member 106 and travels toward the head tube 78. Therefore, the alarm sound can be propagated into the head tube 78 efficiently.

The alarm sound propagated into the head tube 78 is prevented by the fifth sound insulating member 268 from being propagated into the down tube 80, and is also prevented by the first sound insulating member 102 and the second sound insulating member 104 from being dispersed in the head tube 78. Therefore, the alarm sound is radiated through the sound radiating holes 110 . . . 110 in the forward direction of the bicycle, and can capture attention of the walking people around the bicycle.

The motor-assisted bicycle 10B according to the present embodiment is not limited to the above arrangement. The battery unit 232 may be mounted on a portion of the outer circumferential surface of the top tube 86 which faces in the upward direction of the bicycle.

Third Embodiment

A motor-assisted bicycle 10C according to a third embodiment of the present invention will be described below with reference to FIG. 14.

Figure 14:
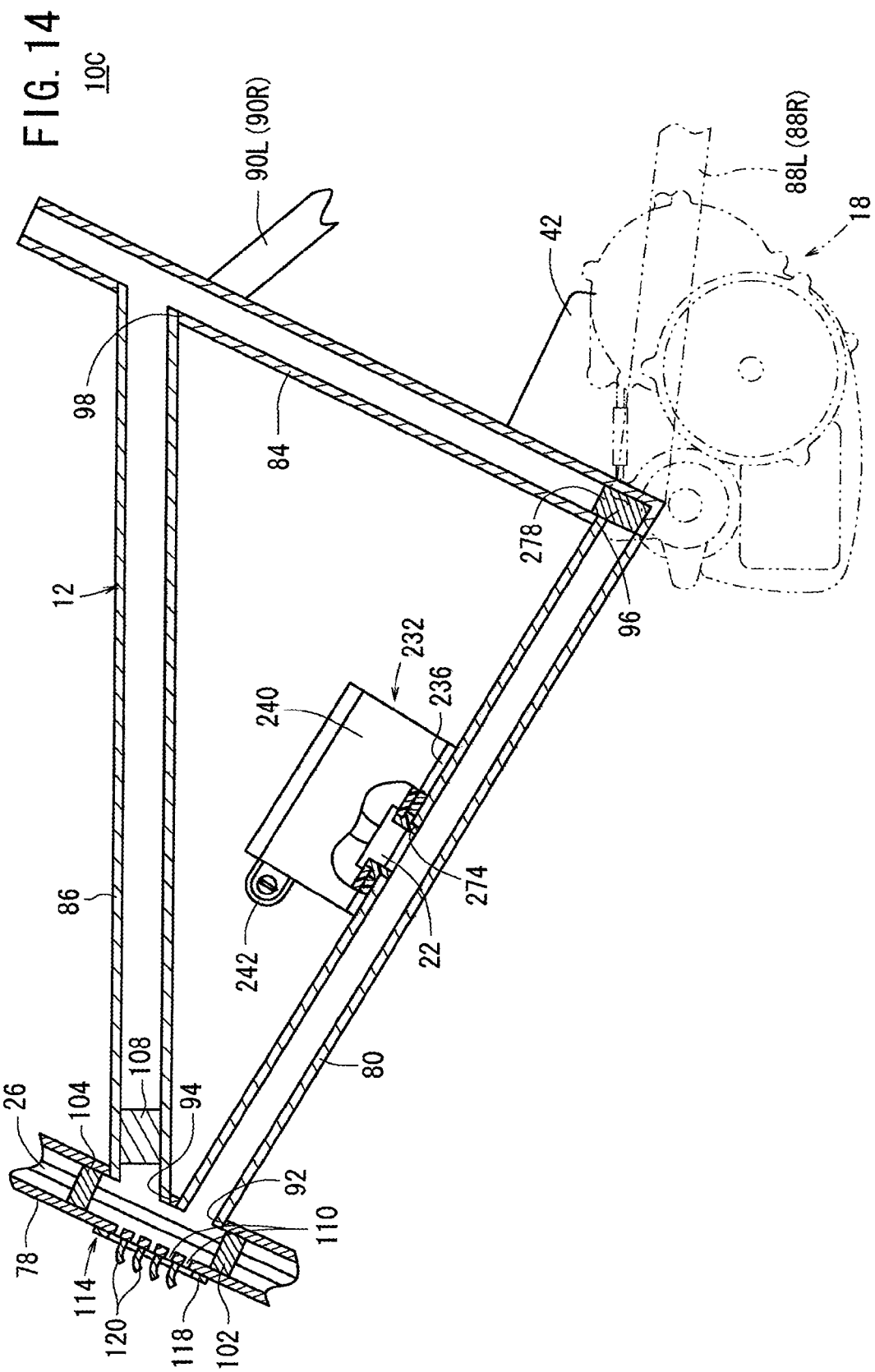
FIG. 14 is a cross-sectional view, partly omitted from illustration, showing a central portion of a motor-assisted bicycle according to a third embodiment of the present invention.

As shown in FIG. 14, the motor-assisted bicycle 10C according to the present embodiment includes the battery unit 232 described according to the second embodiment, mounted on a surface of the outer circumferential surface of the down tube 80 which faces the top tube 86. The down tube 80 has an inlet opening 274 defined therein for introducing the alarm sound from the alarm buzzer 22 into the down tube 80.

As can be seen from FIG. 14, a sixth sound insulating member 278 is disposed in the seat tube 84 in closing relation to the opening in the other end of the down tube 80. The third sound insulating member 106 is dispensed with.

With the motor-assisted bicycle 10C according to the present embodiment, the alarm sound generated by the alarm buzzer 22 is introduced through the inlet opening 274 into the down tube 80, and propagated therethrough into the head tube 78. At this time, part of the alarm sound that is propagated in the down tube 80 toward the seat tube 84 is reflected by the sixth sound insulating member 278 and travels toward the head tube 78. Therefore, the alarm sound can be propagated into the head tube 78 efficiently. The alarm sound can thus capture attention of the walking people around the bicycle.

The motor-assisted bicycle 10C according to the present embodiment is not limited to the above arrangement. The battery unit 232 may be mounted on a portion of the outer circumferential surface of the down tube 80 which faces in the downward direction of the bicycle.

According to the first through third embodiments, as described above, the alarm sound of the alarm buzzer 22 is propagated in a portion of the body frame 12 and radiated through the sound radiating holes 110 . . . 110 of the head tube 78. Therefore, the level of the alarm sound radiated through the sound radiating holes 110 . . . 110 can be kept at a substantially constant level regardless of the position where the battery unit 20, 232 is installed. The freedom with which to install the battery unit 20, 232 is thus increased.

Fourth Embodiment

A motor-assisted bicycle 10D according to a fourth embodiment of the present invention will be described below with reference to FIGS. 15 and 16.

Figure 15:
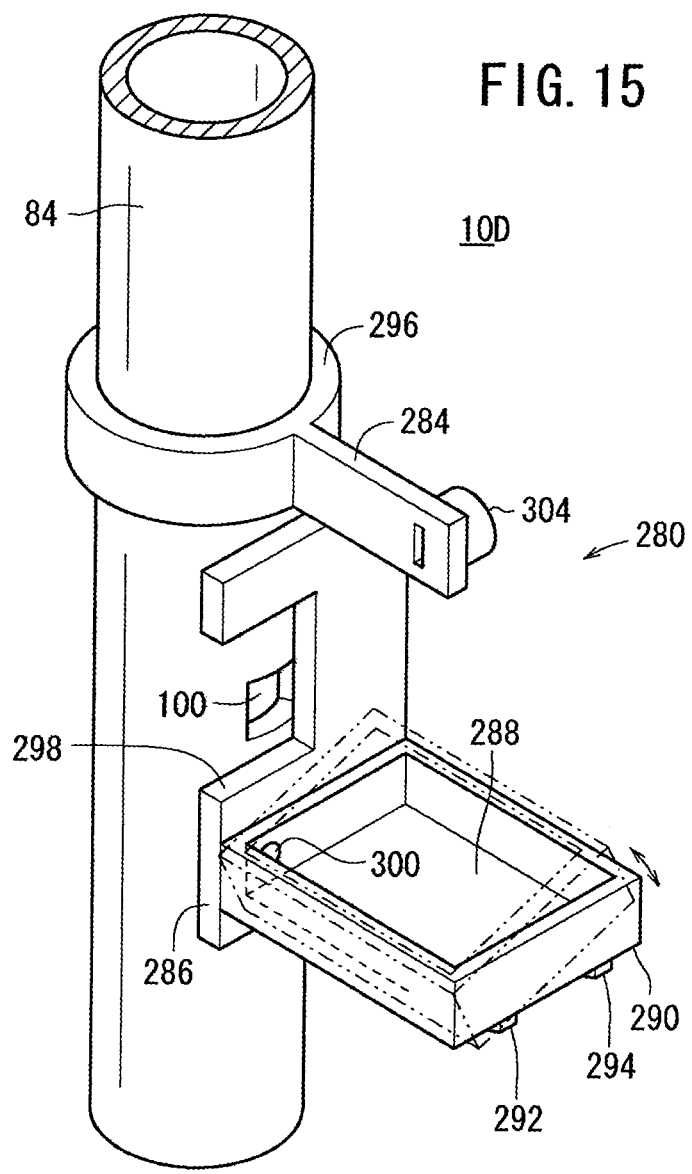
FIG. 15 is a perspective view of a seat tube and an attachment member of a motor-assisted bicycle according to a fourth embodiment of the present invention.
Figure 16:
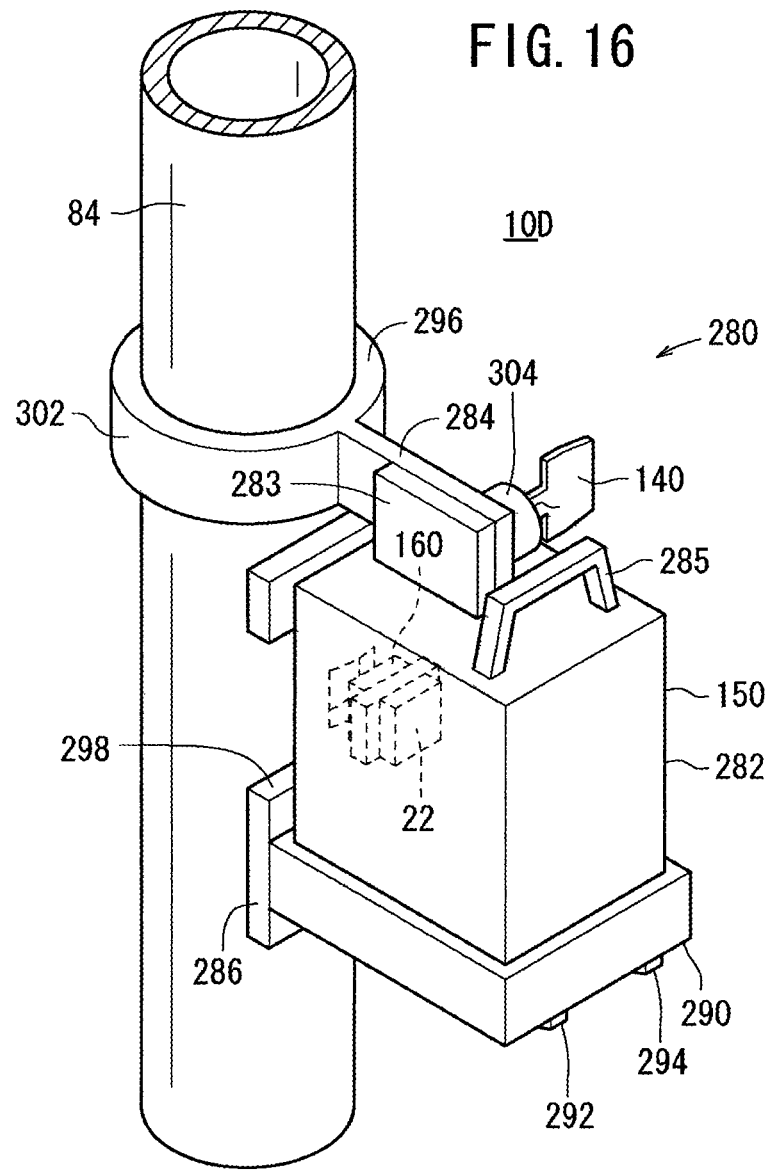
FIG. 16 is a perspective view of the attachment member shown in FIG. 15 with a battery module mounted thereon.

As shown in FIGS. 15 and 16, the motor-assisted bicycle 10D according to the present embodiment includes a battery unit 280 instead of the battery unit 20. The battery unit 280 includes a battery module 282 and an attachment member 284 with which the battery module 282 is mounted on the seat tube 84.

The battery module 282 is basically of a structure substantially identical to the battery module 128 shown in FIG. 6. A casing 150 has on its upper surface a key receptacle 283 corresponding to a key unit 304 to be described later and a handle 285.

The attachment member 284 includes a fixed plate (fixed member) 286 fixed to a portion of the outer circumferential surface of the seat tube 84 which faces rearwardly of the bicycle, a mount frame (support member) 290 mounted on the fixed plate 286 and having a hole 288 defined therein in which the bottom of the battery module 282 can be fitted, a pair of support bars 292, 294 extending from the lower end of the fixed plate 286 and supporting the mount frame 290 thereon, and a holder 296 positioned above the fixed plate 286 and disposed on the seat tube 84.

The fixed plate 286 has a recess 298 defined therein over the inlet opening 100 of the seat tube 84. The mount frame 290 is attached to the fixed plate 286 by a retainer 300 for tilting movement along the surface of the fixed plate 286 about the retainer 300. The mount frame 290 is thus tiltable along the transverse direction of the bicycle. The holder 296 has a holder body 302 fitted over the seat tube 84 and a key unit 304 projecting from the holder body 302 along the rearward direction of the bicycle.

The key unit 304, which engages in the key receptacle 283, allows the key 140 to be selectively brought into the "closed position," the "open position," or the "operational position," as with the first embodiment. In the "closed position" according to the present embodiment, the battery module 282 is locked on the holder 296.

A procedure for replacing the battery module 282 on the motor-assisted bicycle 10D thus constructed will be described below. For removing the battery module 282 from the attachment member 284, the worker initially brings the key 140 into the "open position" to unlock the battery module 282 from the holder 296.

Then, while gripping the handle 285, the worker pulls the battery module 282 and tilts the mount frame 290 along the surface of the fixed plate 286. The battery module 282 is thus tilted a certain angle with respect to the seat tube 84 in a transverse direction of the bicycle. At this time, since the fixed plate 286 has the recess 298 defined therein, the mount 158 of the battery module 282 is kept out of physical interference with the fixed plate 286.

Then, the worker lifts the battery module 282 from the mount frame 290, thereby removing the battery module 282 from the attachment member 284.

For installing the battery module 282 on the attachment member 284, the worker tilts the mount frame 290 toward itself and then brings the bottom of the battery module 282 into fitting engagement with the hole 288 in the mount frame 290. Then, the worker tilts the battery module 282 away from itself until the bottom of the mount frame 290 abuts against the support bars 292, 294. The battery module 282 is not stably supported on the support bars 292, 294, and the key receptacle 283 of the battery module 282 is held against the key unit 304. Thereafter, the worker inserts the key 140 into the keyhole of the key unit 304 and turns the key 140 into the "closed position," thus locking the battery module 282 on the holder 296.

With the motor-assisted bicycle 10D according to the present embodiment, since the mount frame 290 on which the battery module 282 is installed is tiltable with respect to the fixed plate 286 along the transverse direction of the bicycle, the stays 90L, 90R can be suitably prevented from interfering with the process of replacing the battery module 282. Accordingly, the battery module 282 can efficiently be replaced.

The motor-assisted bicycle 10D according to the present embodiment is not limited to the above arrangement. The battery unit 280 may have a holder (stopper) for holding the mount frame 290 tilted toward the worker, thereby allowing the battery module 282 to be stably fitted into the hole 288 in the mount frame 290 and also allowing the battery module 282 to be stably removed from the mount frame 290.

The attachment member 284 may be mounted on a portion of the outer circumferential wall of the seat tube 84 which faces forwardly of the bicycle. In this case, the top tube 86 can be suitably prevented from interfering with the process of replacing the battery module 282.

Fifth Embodiment

A motor-assisted bicycle 10E according to a fifth embodiment of the present invention will be described below with reference to FIGS. 17 through 19.

Figure 17:
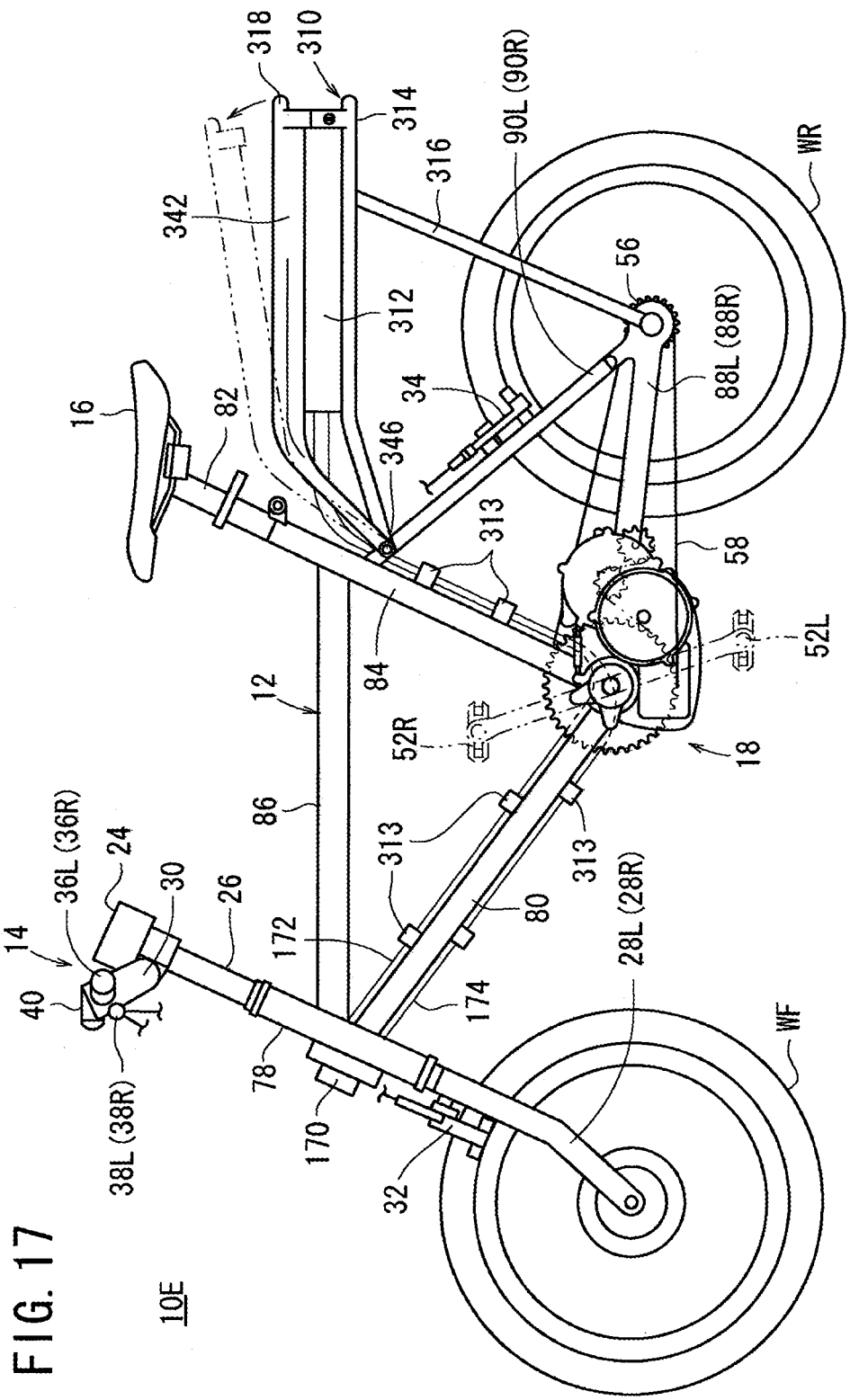
FIG. 17 is a left side elevational view of a motor-assisted bicycle according to a fifth embodiment of the present invention.

As shown in FIG. 17, with the motor-assisted bicycle 10E according to the present embodiment, the alarm buzzer body 170 is secured to a portion of the head tube 78 which faces forwardly of the bicycle, and a battery module 312 is mounted on a rear carrier (holding member) 310 fixed to the stays 90L, 90R. The leads 172, 174 of the alarm buzzer 22 are electrically connected to the battery module 312. According to the present embodiment, the cover 114 and the first through fourth sound insulating members 102, 104, 106, 108, etc. are dispensed with.

A plurality of hooks 313 . . . 313 for securing the leads 172, 174 are mounted on the down tube 80 and the seat tube 84. As the hooks 313 . . . 313 keep the leads 172, 174 extending along the down tube 80 and the seat tube 84, the leads 172, 174 do not interfere with the rider when the rider gets on and off the bicycle and drives the bicycle.

The rear carrier 310, which is disposed rearwardly of the seat 16 with respect to the bicycle, includes a base 314 fixed to ends of the stays 90L, 90R, stiffeners 316 joined to the other ends of the stays 90L, 90R and supporting the base 314, and a cover member 318 mounted on the base 314.

Figure 18:
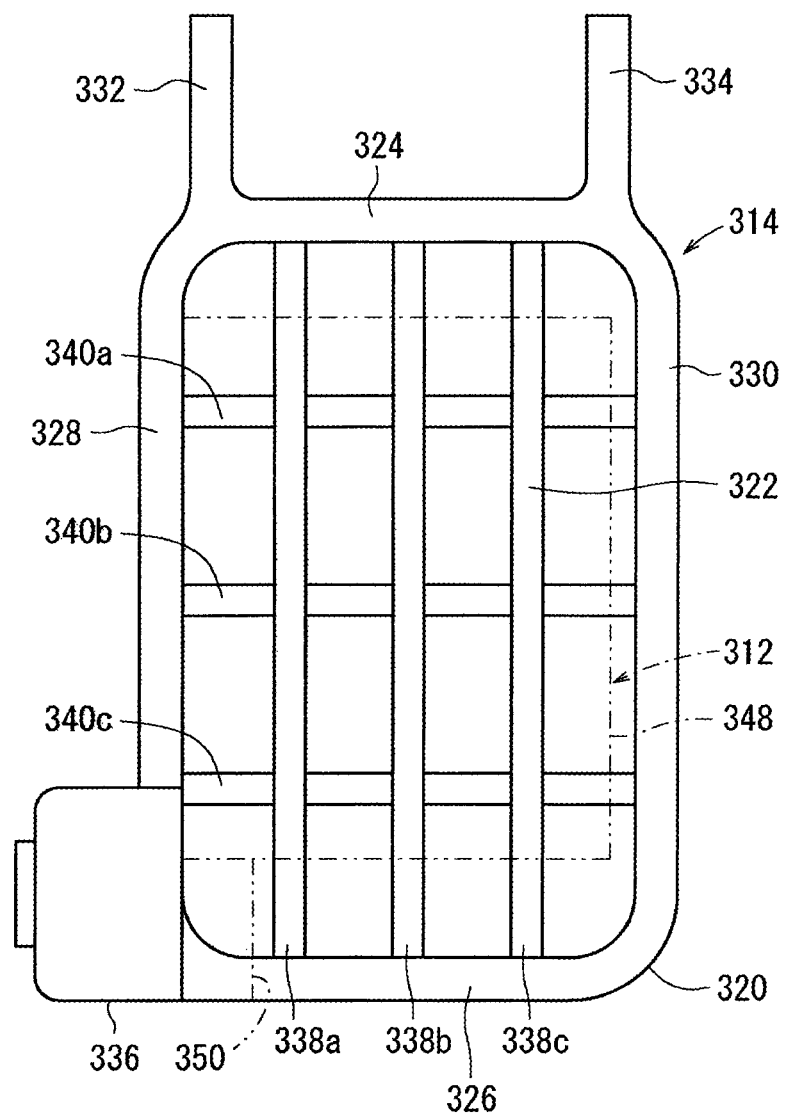
FIG. 18 is a plan view of a base shown in FIG. 17.

As shown in FIG. 18, the base 314 has a frame 320 having a rectangular annular shape in plan view and extending along the longitudinal direction of the bicycle, and a grid-like support 322 disposed in the frame 320 for placing the battery module 312 thereon.

The frame 320 includes a pair of shorter sides 324, 326 extending along the transverse direction of the bicycle, a pair of longer sides 328, 330 interconnecting the ends of the shorter sides 324, 326, and a pair of fixing members 332, 334 integrally joined to the opposite ends of the shorter side 324 and fixed to the ends of the stays 90L, 90R. A key unit 336 is mounted on the boundary between the shorter side 326 and the longer side 328 (a corner of the frame 320).

The support 322 includes a plurality of (three in FIG. 18) first rods 338*a* through 338*c* extending along the longitudinal direction of the bicycle and joining the shorter sides 324, 326, and a plurality of (three in FIG. 18) second rods 340*a* through 340*c* extending along the transverse direction of the bicycle and joining the longer sides 328, 330. The first rods 338*a* through 338*c* are spaced at equal intervals along the transverse direction of the bicycle, and the second rods 340*a* through 340*c* are spaced at equal intervals along the longitudinal direction of the bicycle.

Figure 19:
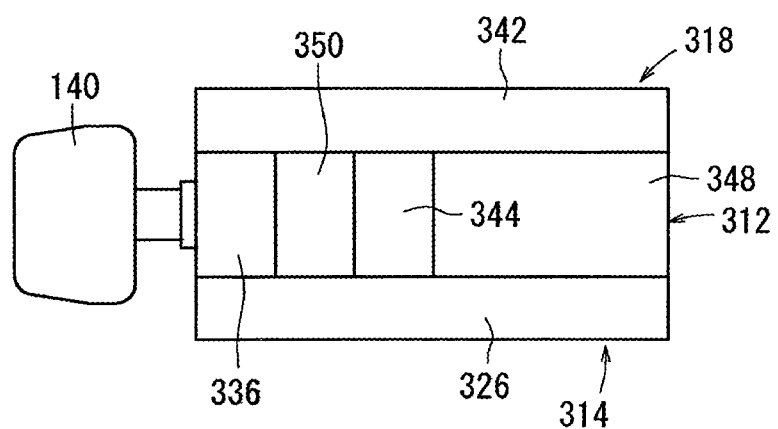
FIG. 19 is a view of a rear carrier shown in FIG. 17 as viewed from behind the bicycle.

As shown in FIG. 19, the cover member 318 includes a cover member body 342 for covering the battery module 312 from above and a key receptacle 344 mounted on the cover member body 342 in association with the key unit 336. The cover member body 342 is connected to the fixing members 332, 334 of the frame 320 by a hinge 346 (see FIG. 17), so that the cover member 318 is tiltable with respect to the base 314 along the longitudinal direction of the bicycle.

The battery module 312 includes a battery module body 348 placed on the support 322 and a key insertion member 350 mounted on the battery module body 348 and interposed between the key unit 336 of the base 314 and the key receptacle 344 of the cover member 318.

According to the present embodiment, with the key insertion member 350 being interposed between the key unit 336 and the key receptacle 344 of the cover member 318, the key unit 336 allows the key 140 to be selectively brought into the "closed position," the "open position," or the "operational position," as with the first embodiment. In the "closed position" according to the present embodiment, the battery module 312 and the cover member 318 are locked on the base 314.

With the motor-assisted bicycle 10E according to the present embodiment, since the alarm buzzer body 170 is secured to the portion of the head tube 78 which faces forwardly of the bicycle, the alarm sound generated by the alarm buzzer body 170 is not blocked by components of the bicycle (e.g., the body frame 12).

According to the present embodiment, furthermore, as the battery module body 348 is placed on the grid-like support 322, the heat generated by the battery module 348 is released through the grid gaps of the grid-like support 322.

The present invention is not limited to the above embodiments, but may adopt various arrangements without departing from the scope thereof.

For example, the alarm buzzer 22 may be arranged to generate an alarm sound whose frequency varies depending on the vehicle speed.

A motor-assisted bicycle according to the embodiment includes an assistive motor (66) for generating a drive force to assist in a pedaling force applied by a rider to pedals (52L, 52R), a battery module (128, 240, 282, 312) including batteries (142 ... 142) as a power supply for the assistive motor (66), and an alarm buzzer (22) mounted in the battery module (128, 240, 282, 312), wherein an alarm sound generated by the alarm buzzer (22) is emitted in a forward direction of the motor-assisted bicycle.

According to this motor-assisted bicycle, since the alarm sound generated by the alarm buzzer is radiated in the forward direction of the bicycle, the alarm sound is thus efficiently transmitted to walking people ahead of the bicycle, thereby capturing attention of those walking people around the bicycle.

The symbols in the parentheses are added in agreement with the symbols in the accompanying drawings for an easy understanding of the embodiment of the present invention. The present invention should not be interpreted as being limited to those components which are denoted by the characters. This holds true for the following paragraphs.

The motor-assisted bicycle according to the embodiment further includes a case member (126, 236) housing the battery module (128, 240, 282, 312) and the alarm buzzer (22) therein, a head tube (78) supporting a steering shaft (26) for steering a front wheel (WF), and a joint tube (80, 84, 86) joined to the head tube (78), the case member (126, 236) being mounted on the joint tube (80, 84, 86), wherein the joint tube (80, 84, 86) has an inlet opening (100, 234, 274) defined therein for introducing the alarm sound generated by the alarm buzzer (22) into the joint tube (80, 84, 86), and the head tube (78) has sound radiating holes (110 ... 110) defined therein for radiating the alarm sound propagated through the joint tube (80, 84, 86) into the head tube (78) in the forward direction of the motor-assisted bicycle.

According to this motor-assisted bicycle, inasmuch as the battery module and the alarm buzzer are housed together in the case member mounted on the joint tube, the alarm buzzer and the battery module (other electric components) are efficiently located together, and the case member is shared by the battery module for protection thereof (water resistance) and the alarm buzzer for protection thereof (water resistance). As a space for installing the alarm buzzer therein may be smaller than if the alarm buzzer were disposed outside of the case member, it is easy to keep the installation space for the alarm buzzer.

Furthermore, the number of parts used can be reduced as there is no need for a component (dedicate stay or the like) with which to install the alarm buzzer directly on the joint tube or the like. The alarm sound of the alarm buzzer is propagated in the joint tube and radiated through the sound radiating holes of the head tube. Therefore, the level of the alarm sound radiated through the sound radiating holes can be kept at a substantially constant level regardless of the position where the battery module (case member) is installed. The freedom with which to install the battery unit is thus increased.

The motor-assisted bicycle according to the embodiment further includes an alarm controller (228) for drive-controlling the alarm buzzer (22), vehicle speed acquiring means (62, 220) for acquiring a vehicle speed, and determination means (224) for determining whether or not the vehicle speed acquired by the vehicle speed acquiring means (62, 220) is equal to or smaller than a predetermined speed, wherein the alarm controller (228) drives the alarm buzzer (22) if the determination means (224) decides that the vehicle speed is equal to or smaller than the predetermined speed.

According to this motor-assisted bicycle, the alarm controller drives the alarm buzzer if the determination means decides that the vehicle speed is equal to or smaller than the predetermined speed. Therefore, even when the noise that the motor-assisted bicycle makes while traveling is low, the alarm buzzer is driven, thus capturing attention of the walking people around the bicycle.

In the motor-assisted bicycle according to the embodiment, the battery module (128, 240, 282) has monitoring means (148) for monitoring a state of the batteries (142 . . . 142), and the monitoring means (148) includes the alarm controller (228) and the determination means (224).

According to this motor-assisted bicycle, since the alarm controller and the determination means are included in the monitoring means of the battery module, the motor-assisted bicycle is rendered more compact than if the alarm controller, the determination means, and the monitoring means were separately provided.

The motor-assisted bicycle according to the embodiment further includes an alarm button (210) operable by the rider, wherein the alarm controller (228) drive-controls the alarm buzzer (22) based on an output signal from the alarm button (210).

According to this motor-assisted bicycle, when the rider operates the alarm button, the alarm sound is generated. Therefore, attention of the walking people around the bicycle can be captured based on the judgment of the rider.

The motor-assisted bicycle according to the embodiment further includes sound insulating members (102, 104, 106, 108, 268, 278) disposed in the head tube (78) and the joint tube (80, 84, 86), for preventing the alarm sound generated by the alarm buzzer (22) from being propagated in directions different from a direction toward the sound radiating holes (110).

According to this motor-assisted bicycle, the sound insulating members can suitably prevent the alarm sound from being propagated in the head tube and the joint tube in directions different from a direction toward the sound radiating holes.

The motor-assisted bicycle according to the embodiment further includes a cover (114) disposed on the head pipe (78), for preventing foreign matter from being introduced through the sound radiating holes (110 . . . 110) into the head pipe (78).

According to this motor-assisted bicycle, the cover disposed on the head tube prevents rainwater or the like from entering the head tube through the sound radiating holes, and hence from corroding the head tube and the joint tube.

In the motor-assisted bicycle according to the embodiment, the joint tube (80, 84, 86) includes a down tube (80) extending rearwardly and downwardly from the head tube (78) with respect to the motor-assisted bicycle, a seat tube (84) joined to the down tube (80) and supporting a seat (16) for the rider to sit thereon, and a top tube (86) positioned above the down tube (80) and interconnecting the head tube (78) and the seat tube (84), wherein the inlet opening (100, 234, 274) is defined in either one of the down tube (80), the seat tube (84), and the top tube (86).

According to this motor-assisted bicycle, the alarm sound of the alarm buzzer can be introduced into either one of the down tube, the seat tube, and the top tube and propagated into the head pipe.

The motor-assisted bicycle according to the embodiment further includes a seat tube (84) supporting a seat (16) for the rider to sit thereon, a fixed member (286) fixed to the seat tube (84), and a support member (290) supporting the battery module (282) removably and mounted on the fixed member (286) for tilting movement along transverse direction of the motor-assisted bicycle.

According to this motor-assisted bicycle, even with the top tube and stays being positioned above the battery module, the support member can be tilted along the transverse direction of the bicycle. Therefore, the top tube and the stays can be suitably prevented from interfering with the process of replacing the battery module (to charge batteries). Accordingly, the battery module can efficiently be replaced.

The motor-assisted bicycle according to the embodiment further includes a holding member (310) positioned rearwardly of a seat (16) for the rider to sit thereon, with respect to the motor-assisted bicycle, and holding the battery module (312), and a head tube (78) supporting a steering shaft (26) for steering a front wheel (WF), wherein the alarm buzzer (22) includes an alarm buzzer body (170) mounted on a portion of the head tube (78) which faces forwardly of the motor-assisted bicycle, and connecting lines (172, 174) electrically connecting the alarm buzzer body (170) and the battery module (312) to each other.

According to this motor-assisted bicycle, since the alarm buzzer body is secured to the portion of the head tube which faces forwardly of the bicycle, the alarm sound generated by the alarm buzzer body is not blocked by components of the bicycle.

In the motor-assisted bicycle according to the embodiment, the holding member (310) includes a base (314) on which the battery module (312) is placed, and a cover member (318) mounted on the base (314) in covering relation to at least a portion of the battery module (312), and the base (314) includes a frame (320) having an annular shape and a grid-like support (322) disposed in the frame (320).

According to this motor-assisted bicycle, the battery module can be held in position by the base and the cover member. As the battery module is placed on the grid-like support, the heat generated by the battery module is released through the grid gaps of the grid-like support.

Obviously, numerous modifications and variations of the present invention are possible in light of the above teachings. It is therefore to be understood that within the scope of the appended claims, the invention may be practiced otherwise than as specifically described herein.

What is claimed is:

1. A motor-assisted bicycle comprising:
   an assistive motor to generate a drive force to assist in a pedaling force applied by a rider to pedals;
   a battery module including batteries as a power supply for the assistive motor;
   an alarm buzzer mounted in the battery module to generate an alarm sound, the alarm sound generated by the alarm buzzer being emitted in a forward direction of the motor-assisted bicycle;
   a case member housing the battery module and the alarm buzzer in the case member;
   a head tube supporting a steering shaft to steer a front wheel;
   a joint tube joined to the head tube, the case member being mounted on the joint tube, the joint tube having an inlet opening defined in the joint tube to introduce the alarm sound generated by the alarm buzzer into the joint tube, the head tube having sound radiating holes defined in the head tube to radiate the alarm sound propagated through the joint tube into the head tube in the forward direction of the motor-assisted bicycle; and
   a cover disposed on the head tube, to prevent foreign matter from being introduced through the sound radiating holes into the head tube.

2. The motor-assisted bicycle according to claim 1, further comprising:
   an alarm controller configured to control the alarm buzzer;
   a vehicle speed acquiring device configured to acquire a vehicle speed of the motor-assisted bicycle; and a determination device configured to determine whether or not the vehicle speed acquired by the vehicle speed acquiring device is equal to or smaller than a predetermined speed, wherein the alarm controller drives the alarm buzzer if the determination device decides that the vehicle speed is equal to or smaller than the predetermined speed.

3. The motor-assisted bicycle according to claim 2, wherein
the battery module has monitoring device configured to monitor a state of the batteries; and
the monitoring device includes the alarm controller and the determination device.

4. The motor-assisted bicycle according to claim 2, further comprising:
an alarm button operable by the rider,
wherein the alarm controller is configured to control the alarm buzzer based on an output signal from the alarm button.

5. The motor-assisted bicycle according to claim 1, further comprising:
sound insulating members disposed in the head tube and the joint tube, to prevent the alarm sound generated by the alarm buzzer from being propagated in directions different from a direction toward the sound radiating holes.

6. The motor-assisted bicycle according to claim 1, wherein
the joint tube includes
a down tube extending rearwardly and downwardly from the head tube with respect to the motor-assisted bicycle,
a seat tube joined to the down tube and supporting a seat on which the rider is to sit, and
a top tube positioned above the down tube and interconnecting the head tube and the seat tube, and
the inlet opening is defined in one of the down tube, the seat tube, and the top tube.

7. The motor-assisted bicycle according to claim 1, further comprising:
a seat tube supporting a seat on which the rider is to sit;
a fixed member fixed to the seat tube; and
a support member supporting the battery module removably mounted on the fixed member for tilting movement along a transverse direction of the motor-assisted bicycle.

8. A motor-assisted bicycle comprising:
an assistive motor to generate a drive force to assist in a pedaling force applied by a rider to pedals;
a battery module including batteries as a power supply for the assistive motor;
an alarm buzzer mounted in the battery module to generate an alarm sound, the alarm sound generated by the alarm buzzer being emitted in a forward direction of the motor-assisted bicycle;
a holding member positioned rearwardly of a seat on which the rider is to sit, with respect to the motor-assisted bicycle, and holding the battery module; and
a head tube supporting a steering shaft to steer a front wheel, wherein
the alarm buzzer includes
an alarm buzzer body mounted on a portion of the head tube which faces forwardly of the motor-assisted bicycle, and
connecting lines electrically connecting the alarm buzzer body and the battery module to each other,
the holding member includes
a base on which the battery module is placed, and
a cover member mounted on the base in covering relation to at least a portion of the battery module, and
the base includes
a frame having an annular shape, and
a grid support disposed in the frame.

9. A motor-assisted bicycle comprising:
an assistive motor to generate a drive force to assist in a pedaling force applied by a rider to pedals;
a battery module including batteries as a power supply for the assistive motor;
an alarm buzzer mounted in the battery module to generate an alarm sound, the alarm sound generated by the alarm buzzer being emitted in a forward direction of the motor-assisted bicycle; and
a tube frame supporting the assistive motor and the battery module, the tube frame including an inlet opening and an outlet opening, the inlet opening being provided to introduce the alarm sound generated by the alarm buzzer into the tube frame, the outlet opening allowing the alarm sound introduced into the tube frame to be emitted outside the tube frame in the forward direction of the motor-assisted bicycle, wherein
the battery module further includes a casing housing the batteries and the alarm buzzer, and
the casing includes an outlet hole communicating with the inlet opening.

10. The motor-assisted bicycle according to claim 9, wherein
the outlet opening is disposed in front of the inlet opening.

11. The motor-assisted bicycle according to claim 9, further comprising:
a steering shaft rotatably supported by the tube frame; and
a front wheel rotatably supported by the steering shaft, wherein
the tube frame includes a head tube and a joint tube, the head tube including the outlet opening, the joint tube being connected to the head tube and including the inlet opening, and
the steering shaft is rotatably supported by the head tube.

12. The motor-assisted bicycle according to claim 11, wherein
the joint tube supports the assistive motor and the battery module.

13. The motor-assisted bicycle according to claim 9, wherein
the alarm buzzer is attached to the casing to cover the outlet hole.

* * * * *